(12) United States Patent
Isshiki et al.

(10) Patent No.: US 9,306,208 B2
(45) Date of Patent: Apr. 5, 2016

(54) MANUFACTURING METHOD OF AN ELECTRODE FOR ELECTROCHEMICAL ELEMENT AND AN ELECTROCHEMICAL ELEMENT

(75) Inventors: Yasuhiro Isshiki, Yokohama (JP); Yasuhiro Wakizaka, Yokohama (JP)

(73) Assignee: ZEON CORPORATION, Tokyo (JP)

( * ) Notice: Subject to any disclaimer, the term of this patent is extended or adjusted under 35 U.S.C. 154(b) by 436 days.

(21) Appl. No.: 13/980,633

(22) PCT Filed: Jan. 23, 2012

(86) PCT No.: PCT/JP2012/051359
§ 371 (c)(1),
(2), (4) Date: Oct. 7, 2013

(87) PCT Pub. No.: WO2012/099264
PCT Pub. Date: Jul. 26, 2012

(65) Prior Publication Data
US 2014/0023922 A1 Jan. 23, 2014

(30) Foreign Application Priority Data

Jan. 21, 2011 (JP) .................. 2011-011166
Feb. 4, 2011 (JP) .................. 2011-023176

(51) Int. Cl.
| | |
|---|---|
| H01M 4/02 | (2006.01) |
| H01M 4/04 | (2006.01) |
| H01G 11/22 | (2013.01) |
| H01G 11/46 | (2013.01) |
| H01M 4/134 | (2010.01) |
| H01M 4/1395 | (2010.01) |
| H01M 4/36 | (2006.01) |
| H01M 4/38 | (2006.01) |
| H01M 4/62 | (2006.01) |
| H01M 10/0525 | (2010.01) |
| H01M 10/054 | (2010.01) |

(52) U.S. Cl.
CPC ............. *H01M 4/0433* (2013.01); *H01G 11/22* (2013.01); *H01G 11/46* (2013.01); *H01M 4/043* (2013.01); *H01M 4/134* (2013.01); *H01M 4/1395* (2013.01); *H01M 4/364* (2013.01); *H01M 4/382* (2013.01); *H01M 4/622* (2013.01); *H01M 4/0435* (2013.01); *H01M 4/366* (2013.01); *H01M 10/054* (2013.01); *H01M 10/0525* (2013.01); *Y02E 60/122* (2013.01); *Y02E 60/13* (2013.01); *Y02P 70/54* (2015.11)

(58) Field of Classification Search
CPC .. H01M 4/8896; H01M 4/0435; H01M 4/043
See application file for complete search history.

(56) References Cited

U.S. PATENT DOCUMENTS

2011/0045355 A1   2/2011   Ichikawa

FOREIGN PATENT DOCUMENTS

| JP | 2007-242356 A | 9/2007 |
| JP | 2008-251776 A | 10/2008 |
| JP | 2011-65982 A | 3/2011 |

OTHER PUBLICATIONS

International Search Report Issued in PCT/JP2012/051359, mailed on Apr. 17, 2012.
Forms PCT/IB/338, PCT/IB/373, and an English translation of PCT/ISA/237 for International Application No. PCT/JP2012/051359, dated Aug. 8, 2013.

*Primary Examiner* — Jane Rhee
(74) *Attorney, Agent, or Firm* — Birch, Stewart, Kolasch & Birch, LLP

(57) ABSTRACT

Disclosed is a manufacturing method of an electrode for an electrochemical element having a superior adhesion and is used for an electrochemical element with excellent productivity due to a short predoping time. Specifically disclosed is that the method is characterized by comprising a step for compression forming of electrode material (a mixed powder or composite particles) including an alkaline metal powder or an alkaline earth metal powder each having a coated surface.

20 Claims, 1 Drawing Sheet

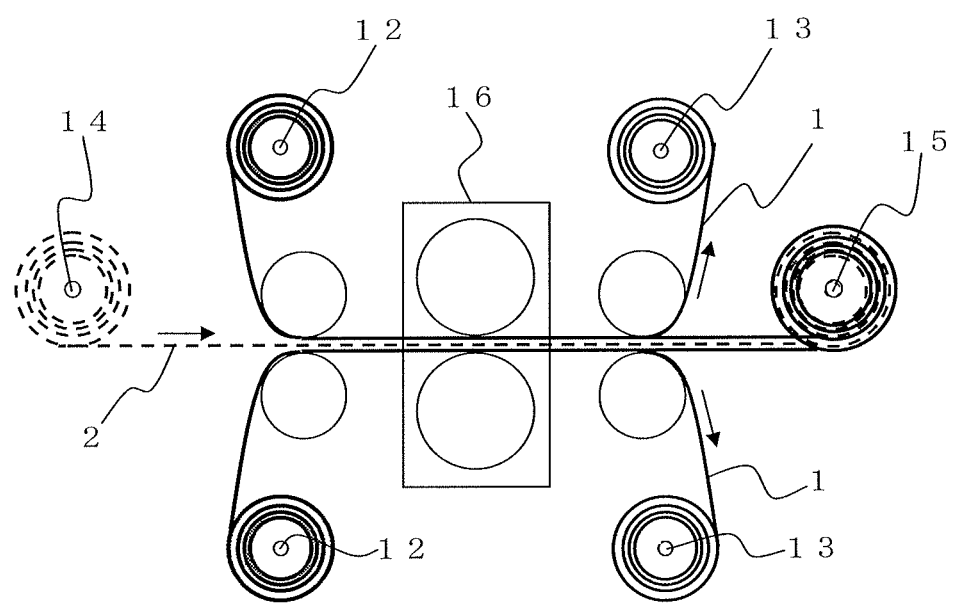

MANUFACTURING METHOD OF AN ELECTRODE FOR ELECTROCHEMICAL ELEMENT AND AN ELECTROCHEMICAL ELEMENT

TECHNICAL FIELD

The present invention relates to a manufacturing method of an electrode for an electrochemical element, which manufactures an electrochemical element with an excellent productivity, a high-energy density and an excellent charge-discharge cycle characteristic.

BACKGROUND ART

Irreversible capacity generates at an initial charge of a lithium-ion secondary battery, due to a formation of a coated surface called SEI on a negative electrode. Capacity of the lithium-ion secondary battery decreases for this irreversible capacity.

Considering above, it is well-known that capacity of a lithium-ion secondary battery increases by doping (predoping) lithium to a negative electrode material for an irreversible capacity in advance (See Patent Article 1, for instance). However, as described in Patent Article 1, with a predoping method using a current collector with holes and electrochemically contacting a lithium metal foil with a negative electrode, there is a problem of a long predoping time which leads to a low productivity of a lithium-ion secondary battery and ununiform doping of lithium at negative electrode.

Therefore, a predoping technique wherein lithium metal powder, an electrode active material and a binding agent are mixed in a solvent is disclosed in Patent Article 2. However, with said Patent Article 2, due to a high reactivity of lithium metal powder, it is necessary to use a non-aqueous solvent as a solvent, and thus, a kind of usable a binding agent is limited. Furthermore, adhesion of an electrode is likely to decrease due to a residual lithium metal in the solvent. As a result, a cycle characteristic of secondary battery is likely to decrease. In addition, lithium metal deteriorates during predoping due to a high reactivity of the lithium metal, which leads to a long predoping time. Further, lithium metal powders migrate when applying and drying electrode material to a current collector and do not uniformly disperse in electrode; and internal resistance of a secondary battery increases.

In order to solve such problems, Patent Article 3 discloses a predoping technique wherein a stabilized lithium metal powder, in which said lithium metal powder is surface treated with carbon dioxide, an electrode active material and a binding agent are mixed in a solvent. However, not only a kind of usable binding agent is still limited, but lithium metal powder is still likely to deteriorate due to heating of a solvent removal. Further, migration of lithium metal powder, when applying and drying electrode material to a current collector, cannot be prevented and it is difficult to manufacture a uniform electrode.

Further, Patent Article 4 discloses a manufacturing method of capacitor electrode by a wet method using slurry including a lithium powder depositing polymer on its surface. With this method, due to a small particle diameter of lithium powder, the lithium powder eccentrically-locate on a surface of a granulated particle when preparing granulated particle by evaporating solvent from slurry including the lithium powder. Thus, the lithium powder cannot be uniformly placed in an electrode, which leads to a problem of lifetime characteristic. And shape forming is difficult when used for compression forming of an electrode.

PATENT ARTICLE

Patent Article 1: Japanese Patent No. 4015993
Patent Article 2: Japanese Patent Laid-Open No. 2002-313324
Patent Article 3: Japanese Patent Laid-Open No. 2007-500922
Patent Article 4: Japanese Patent Laid-Open No. 2007-324271

SUMMARY OF INVENTION

Technical Problem

The present invention solves the problem associated with such prior arts. Accordingly, it is an object of the present invention to provide a manufacturing method of an electrode for an electrochemical element having good adhesion and is used for an electrochemical element with excellent productivity due to a short predoping time.

Solution to the Problems

As a result of keen examination to solve the above problems, the present inventors have found an electrode for an electrochemical element having good adhesion can be manufactured by using an alkaline metal powder or an alkaline earth metal powder each having a coated surface, and further by compression forming a mixed powder, wherein the metal powder and an composite powder including an electrode active material and a binding agent are dry mixed, or composite particles, including the metal powder, an electrode active material and a binding agent. The present inventors have further found that an electrochemical element using the electrode for an electrochemical element is excellent in productivity and charge-discharge cycle characteristic and has a low internal resistance.

The summary of the present invention for the purpose of solving the above problems is as follows.

<1> A manufacturing method of an electrode for an electrochemical element by compression forming a mixed powder including an alkaline metal powder or an alkaline earth metal powder, each having a coated surface, wherein the method comprises:

(1A) a preparing step of composite particles (A) including an electrode active material and a water dispersible binding agent;

(2A) a preparing step of a mixed powder by dry mixing the composite particles (A) and the alkaline metal powder or the alkaline earth metal powder, each having a coated surface;

(3A) a foaming step of an electrode composition layer by compression forming the mixed powder; and (4A) an integration step of the electrode composition layer and a current.

<2> The manufacturing method of the electrode for the electrochemical element according to <1>, wherein (3A) is the foaming step of the electrode composition layer on a substrate by compression forming the mixed powder.

<3> The manufacturing method of the electrode for the electrochemical element according to <2>, comprising a detachment step of the substrate from an electrode composition layer surface, performed after the (4A) step.

<4> The manufacturing method of the electrode for the electrochemical element according to claim <2> or <3>, wherein the substrate is subjected to a roughening treatment.

<5> The manufacturing method of an electrode for an electrochemical element according to any one of <1> to <4>, wherein a mean volume particle diameter of the alkaline metal powder or the alkaline earth metal powder each having a coated surface is 1 to 100 μm.

<6> A manufacturing method of an electrode for an electrochemical element by compression forming composite particles (B) including an alkaline metal powder or an alkaline earth metal powder, each having a coated surface, wherein the method comprises:

(1B) a preparing step of the composite particles (B) including an electrode active material, a binding agent, and an alkaline metal powder or an alkaline earth metal powder, each having a coated surface;

(2B) a foaming step of an electrode composition layer by compression forming the composite particles (B); and (3B) an integration step of the electrode composition layer and a current collector.

<7> The manufacturing method of the electrode for the electrochemical element according to <6>, wherein (2B) is the foaming step of electrode composition layer on a substrate by compression forming the composite particles (B).

<8> The manufacturing method of the electrode for the electrochemical element according to <7>, comprising a detachment step of the substrate from an electrode composition layer surface, performed after the (3B) step.

<9> The manufacturing method of the electrode for the electrochemical element according to any one of <6> to <8>, wherein a conductive adhesive layer is formed on at least one surface of the current collector.

<10> The manufacturing method of an electrode for an electrochemical element according to any one of claims <6> to <9>, wherein the step (1B) comprises:

(1B-1) a slurry preparation step wherein the electrode active material, the binding agent and the alkaline metal powder or the alkaline earth metal powder each having a coated surface are mixed in a non-aqueous solvent; and (1B-2) a composite particles preparation step by granulating the slurry.

<11> The manufacturing method of the electrode for the electrochemical element according to <10>, wherein the granulation is a spray drying granulation.

<12> The manufacturing method of the electrode for the electrochemical element according to any one of <1> to <11>, wherein the alkaline metal powder or the alkaline earth metal powder each having a coated surface is an alkaline metal powder or an alkaline earth metal powder each having a polymer coated surface, and a difference between solubility parameter (SP value) of the polymer and that of a solvent used for an electrolyte of the electrochemical element is within a range of 0.3 to 5.0 $(cal/cm^3)^{1/2}$.

<13> An electrochemical element equipped with the electrode for an electrochemical element obtained from the method according to any one of <1> to <12>.

Effects of Invention

According to the present invention, lowering of a binding force can be prevented by previously forming composite particles (A) including an electrode active material and a water dispersible binding agent. As a result, an electrode for an electrochemical element having excellent adhesion can be manufactured. In addition, according to a manufacturing step of an electrode for an electrochemical element of the present invention, heating for removing solvent is not required due to a dry mixing of composite particles (A) and an alkaline metal powder or an alkaline earth metal powder each having a coated surface, which simplifies its manufacturing process. Further, by using said electrode for an electrochemical element, an electrochemical element with a high-energy density, an excellent charge-discharge cycle characteristic, and a low internal resistance can be obtained.

According to the present invention, an electrode for an electrochemical element having good adhesion can further be manufactured by preparing composite particles (B), including an electrode active material, a binding agent and an alkaline metal powder or an alkaline earth metal powder each having a coated surface, and by compression forming said composite particles (B).

Further, deterioration of an alkaline metal powder or an alkaline earth metal powder can be prevented by using an alkaline metal powder or an alkaline earth metal powder each having a coated surface. Therefore, even when a mixed powder, obtained by uniformly mixing composite particles (A) and an alkaline metal powder or an alkaline earth metal powder each having a coated surface, or composite particles (B), including an alkaline metal powder or an alkaline earth metal powder each having a coated surface, is compression formed, the alkaline metal powder or the alkaline earth metal powder does not deteriorate and predoping time can be shortened. This leads to productivity improvement of an electrochemical element. Furthermore, an electrochemical element having a high-energy density, an excellent charge-discharge cycle characteristic and a low internal resistance can be obtained by using said electrode for an electrochemical element.

BRIEF DESCRIPTION OF DRAWING

FIG. 1 is a schematic chart view showing a step of manufacturing method according to the present invention.

DESCRIPTION OF EMBODIMENTS

A manufacturing method of an electrode for an electrochemical element according to the present invention comprises a step of compression forming an electrode material (hereinafter, "a mixed powder" or "composite particles (B)") including an alkaline metal powder or an alkaline earth metal powder each having a coated surface.

In concrete, the first manufacturing method of an electrode for an electrochemical element according to the present invention comprises: (1A) a preparing step of composite particles (A) including an electrode active material and a water dispersible binding agent, (2A) a preparing step of a mixed powder by dry mixing the composite particles (A) and an alkaline metal powder or an alkaline earth metal powder each having a coated surface, (3A) a foaming step of electrode composition layer by compression forming said mixed powder, and (4A) an integration step of said electrode composition layer and a current collector.

Further, the second manufacturing method of an electrode for an electrochemical element according to the present invention comprises (1B) a preparing step of composite particles (B) including an electrode active material, a binding agent and an alkaline metal powder or an alkaline earth metal powder each having a coated surface, (2B) a preparing step of an electrode composition layer by compression forming the composite particles (B), and (3B) a foaming step of the electrode composition layer and a current collector.

Hereinafter, an electrode active material, a binding agent, an alkaline metal powder or an alkaline earth metal powder each having a coated surface, composite particles (A), composite particles (B) and current collector, all used in the present invention will be described.

<An Electrode Active Material>

An electrode active material is a material which transports electron in an electrode for an electrochemical element. Examples of electrode active material are mainly an electrode active material for a lithium-ion secondary battery, an electrode active material for lithium ion capacitor and the like.

An electrode active material for a lithium-ion secondary battery is used for positive electrode and for negative electrode. Concrete examples of the electrode active material used for positive electrode of a lithium-ion secondary battery include; lithium containing combined metal oxides such as $LiCoO_2$, $LiNiO_2$, $LiMnO_2$, $LiMn_2O_4$, $LiFePO_4$ and $LiFeVO_4$, transition metal sulfides such as $TiS_2$, $TiS_3$ and an amorphous $MoS_3$, transition metal oxides such as $Cu_2V_2O_3$, an amorphous $V_2O.P_2O_5$, $MoO_3$, $V_2O_5$, $V_6O_{13}$. In addition, conductive polymers such as polyacetylene and poly-p-phenylene are exemplified. A lithium containing combined metal oxides are preferable.

A mean volume particle diameter of an electrode active material used for positive electrode of a lithium-ion secondary battery is generally 0.1 to 100 μm, preferably 1 to 50 μm, and more preferably 5 to 20 μm.

An electrode active material used for negative electrode of a lithium-ion secondary battery includes an alloy-based active material, a carbon-based active material and the like.

An alloy-based active material is an active material wherein; its structure includes an element which can insert lithium, and a theoretical electrical capacitance per weight when inserting lithium is 500 mAh/g or more (upper limit of said theoretical electrical capacitance is not particularly limited; however, is may be 5000 mAh/g or less). In concrete, the alloy-based active material includes a lithium metal, a simple metal forming a lithium alloy and an alloy thereof, and their oxide, sulfide, nitride, silicide, carbide and phosphide, and the like.

A simple metal forming the lithium alloy includes simple metals of Ag, Al, Ba, Bi, Cu, Ga, Ge, In, Ni, P, Pb, Sb, Si, Sn, Sr, Zn and the like. Further, an alloy of the simple metal forming the lithium alloy includes a compound including the above-mentioned simple metals. Above all, a simple metal of silicon (Si), stannum (Sn) or lead (Pb), an alloy including said simple metals or their metal compounds can be used.

The alloy-based active material may further include one or more non-metal element. In concrete, SiC, $SiO_xC_y$ (hereinafter, may be mentioned as "Si—O—C") ($0<x\leq3$, $0<x\leq5$), $Si_3N_4$, $Si_2N_2O$, $SiO_x$ ($0<x\leq2$), $SnO_x$ ($0<x\leq2$), LiSiO, LiSnO and the like can be exemplified. Among all, $SiO_xC_y$ is preferable, since it is possible to insert and detach lithium at a law voltage. For instance, $SiO_xC_y$ can be obtained by firing polymer material including silicone. Among said $SiO_xC_y$, $0.8\leq x\leq3$, $2\leq y\leq4$ is preferable when a balance of capacity and cycle characteristic is considered.

Oxide, sulfide, nitride, silicide, carbide and phosphide of lithium metal, a simple metal forming lithium alloy and their alloys respectively include oxide, sulfide, nitride, silicide, carbide, phosphide and the like of an element possible to insert lithium. Among all, the oxide is particularly preferable. In concrete, lithium containing metal composite oxides including oxides, such as tin oxide, manganese oxide, titanium oxide, niobium oxide, vanadium oxide and the like, and metal elements selected from Si, Sn, Pb and Ti atom.

The lithium containing metal composite oxide further exemplifies lithium-titanium composite oxides and lithium-manganese composite oxides shown by $Li_xTi_yM_zO_4$ and $Li_xMn_yM_zO_4$ ($0.7\leq x\leq1.5$, $1.5\leq y\leq2.3$, $0\leq z\leq1.6$ and "M" is Na, K, Co, Al, Fe, Ti, Mg, Cr, Ga, Cu, Zn and Nb), respectively. Among all, $Li_{4/3}Ti_{5/3}O_4$, $Li_1Ti_2O_4$, $Li_{4/5}Ti_{11/5}O_4$, $Li_{4/3}Mn_{5/3}O_4$ are particularly used.

Among all, materials including silicon are preferable, and Si—O—C is particularly preferable for an alloy-based active material. Insertion and detachment of Li is presumed to generate on Si (silicon) at high voltage and on C (carbon) at law voltage within materials including silicon. Thus, expansion and contraction is prevented when compared to the other alloy-based active materials; and a charge-discharge cycle characteristic of an electrochemical element improves.

Mean volume particle diameter of an alloy-based active material is preferably 0.1 to 50 μm, more preferably 0.5 to 20 μm and the most preferably 1 to 10 μm.

A carbon-based active material is an active material having a main backbone of carbon, in which lithium is possible to insert. In concrete, carbonaceous material and graphitized material are exemplified.

Carbonaceous material is generally a carbon material with a low graphitization (a low crystalline) produced by heat-treating (carbonization) a carbon precursor at 2000° C. or less (Lower limit of the heat treatment is not particularly limited; however, it may be 500° C. or more.).

An example of the carbonaceous material includes graphitizable carbon in which the structure of carbon is easily changed by a heat treating temperature, or non-graphitizable carbon having a structure close to an amorphous structure represented by a glass carbon.

Examples of the graphitizable carbon include a carbon material containing tar pitch obtained from petroleum or coal as a raw material; and coke, mesocarbon microbeads (MCMB), a mesophase pitch carbon fiber and a thermal decomposited gas-phase grown carbon fiber or so is exemplified. MCMB are carbon fine particles obtained by separating and extracting mesophase spherules generated during the process of heating the pitches at approximately 400° C. And the mesophase pitch carbon fiber is a carbon fiber containing a mesophase pitch obtained by growing and incorporating the mesophase spherules as a raw material. A thermal decomposited gas-phase grown carbon fiber is a carbon fiber obtained by (1) a thermal decomposition method of such as acrylic polymer fiber, (2) a thermal decomposition method of pitch by fiber spinning or (3) a catalytic chemical vapor deposition (catalyst CVD) method in which a gas-phase thermal decomposition is performed on carbon hydride using nanoparticles such as iron as catalyst. Examples of the non-graphitizable carbon include a phenol resin sintered product, a polyacrylonitrile carbon fiber, quasi-isotropic carbon, a furfuryl alcohol resin sintered product (PFA) and a hard carbon or so.

The graphitized material represents a graphitized material having a high crystallinity close to that of graphite obtained by heat-treating graphitizable carbon at 2000° C. or more (Upper limit of the treating temperature is not particularly limited; however, it may be 5000° C. or less).

Graphitized material includes natural graphite and synthetic graphite. Synthetic graphite mainly exemplifies a synthetic graphite heat treated at 2800° C. or more, a graphitized MCMB heat treating the MCMB at 2000° C. or more, and a graphitization mesophase pitch carbon fiber heat treating mesophase pitch carbon fiber at 2000° C. or more.

Carbonaceous material is preferable for a carbon-based active material. Resistance of an electrochemical element can be reduced with the use of the carbonaceous material; and an electrochemical element superior in input-output characteristics can be manufactured.

Mean volume particle diameter of a carbon-based active material is preferably 0.1 to 100 μm, more preferably 0.5 to 50 μm, and the most preferably 1 to 30 μm.

There are electrode active materials for lithium ion capacitor used for positive electrode and for negative electrode. An electrode active material used for positive electrode of lithium ion capacitor may be a material reversibly supporting lithium ion and anion, such as tetra fluoroborate. In concrete, carbon allotropes are generally used, and an electrode active material used for an electric double layer capacitor can be widely used. Concrete examples of carbon allotropes include active carbon, polyacene, carbon whisker, graphite and the like; and their powders and fibers can be used. Preferable electrode active material is an active carbon. In concrete, an active carbon of a raw material such as phenolic resin, rayon, acrylonitrile resin, pitch, coconut and the like can be exemplified.

Mean volume particle diameter of an electrode active material used for positive electrode of lithium ion capacitor is normally 0.1 to 100 μm, preferably 1 to 50 μm, and more preferably 5 to 20 μm. Specific surface area of an electrode active material used for positive electrode of lithium ion capacitor is 30 $m^2$/g or more, preferably 500 to 5,000 $m^2$/g, more preferably 1,000 to 3,000 $m^2$/g. These electrode active materials can be used alone individually or with a combination of 2 or more kinds.

An electrode active material used for negative electrode of lithium ion capacitor may be a material reversibly supporting lithium ion. In concrete, an electrode active material used for negative electrode of a lithium-ion secondary battery is widely used; and graphite, crystalline carbon material such as non-graphitizable carbon, polyacene material (PAS) described as the above-mentioned positive electrode active material, and the like can be exemplified. Phenolic resin and the like is carbonized, activate when necessary, and then pulverized, in order to be used for such crystalline carbon material and PAS.

Mean volume particle diameter of an electrode active material used for negative electrode of lithium ion capacitor is normally 0.1 to 100 μm, preferably 1 to 50 μm, and more preferably 5 to 20 μm. These electrode active materials can be used alone individually or with a combination of 2 or more kinds.

<A Binding Agent>

Binding agent according to the first manufacturing method is a water dispersible binding agent, wherein particles of the binding agent are dispersed in water, which is a disperse media. Electrode strength can be improved by using a water dispersible binding agent.

Further, binding agent according to the second manufacturing method is not particularly limited; however, a dissolved-type binding agent, wherein binding agent particles are dissolved in disperse media of non-aqueous solvent, is preferable since electrode strength can be improved.

By the use of a binding agent, electrode active materials or an electrode active material and a conductive agent, described hereinafter, are mutually bound.

A water dispersible binding agent includes polymer compounds such as fluorine polymer, diene polymer, acrylate polymer, polyimide, polyamide, polyurethane, and the like. Among all, fluorine polymer, diene polymer or acrylate polymer is preferable. Diene polymer or acrylate polymer is more preferable, due to a high voltage resistance as well as a high energy density of an electrochemical element. Diene polymer is the most preferable due to an improved electrode strength.

Diene polymer or acrylate polymer, generally used as a water dispersible binding agent, can be used as a dissolved-type binding agent by substituting water, a disperse media, with a non-aqueous solvent.

Diene polymer includes homopolymer of conjugated diene, copolymer obtained by polymerization of a monomer mixture including conjugated diene or their hydrogen additives. Conjugated diene rate in said monomer mixture is generally 40 wt % or more, preferably 50 wt % or more, and more preferably 60 wt % or more. In concrete, said diene polymer includes: conjugated diene homopolymers such as polybutadiene and polyisoprene, aromatic vinyl/conjugated diene copolymers such as styrene/butadiene copolymer (SBR) which can be carboxy degenerated, vinyl cyanide/conjugated diene copolymers such as acrylonitrile/butadiene copolymer (NBR), SBR hydrides, NBR hydrides, and the like.

Acrylate polymer is a polymer including a monomer unit derived from a compound shown by a general expression (1):$CH_2=CR^1-COOR^2$ (wherein "$R^1$" is a hydrogen atom or a methyl group and "$R^2$" is an alkyl group or a cycloalkyl group); and in concrete, homopolymer of the compound shown by the general expression (1) or copolymer obtained by polymerizing monomer mixture including compound shown by the general expression (1). Concrete examples of the compound shown by the general expression (1) are: acrylates such as ethyl acrylate, propyl acrylate, isopropyl acrylate, n-butyl acrylate, isobutyl acrylate, tert-butyl acrylate, n-amyl acrylate, isoamyl acrylate, n-hexyl acrylate, 2-ethylhexyl acrylate, lauryl acrylate and stearyl acrylate, and methacrylates such as ethyl methacrylate, propyl methacrylate, isopropyl methacrylate, n-butyl methacrylate, isobutyl methacrylate, tert-butyl methacrylate, n-amyl methacrylate, isoamyl methacrylat, n-hexyl methacrylate, 2-ethylhexyl methacrylate, lauryl methacrylate and stearyl methacrylate. Among all, acrylate is preferable and n-butyl acrylate and 2-ethylhexyl acrylate are more preferable, due to an improvement of the obtained electrode strength. Ratio of monomer unit derived from the compound shown by the general expression (1) in the acrylate polymer is generally 40 wt % or more, preferably 50 wt % or more, and more preferably 70 wt % or more. The use of acrylate polymer, wherein ratio of monomer unit derived from the compound shown by the general expression (1) is within the above-range, leads to a high heat resistance and a small internal resistance of the obtained electrode for an electrochemical element.

The acrylate polymer includes carboxylic acid group contained monomer, which can form copolymer, in addition to a compound shown by the general expression (1). Concrete examples of carboxylic acid group contained monomer are: monobasic acid contained monomers such as acrylic acid and methacrylic acid, and dibasic acid contained monomers such as maleic acid, fumaric acid and itaconic acid. Among all, dibasic acid contained monomer is preferable; and itaconic acid is particularly preferable since it enhances adhesion with current collector and improves electrode strength. Such monobasic acid contained monomer and dibasic acid contained monomer can be used alone or used in combination of 2 or more kinds. Content of carboxylic acid group contained monomer in monomer mixture during copolymerization is generally 0.1 to 50 parts by weight, preferably 0.5 to 20 parts by weight and more preferably 1 to 10 parts by weight, with respect to 100 parts by weight of a compound shown by the general expression (1). When content of carboxylic acid group contained monomer is within the above range, adhesion with current collector becomes superior and the obtained electrode strength improves.

Copolymerizable nitrile group contained monomer in addition to compound shown by the general expression (1) can be used as the above-mentioned acrylate polymer. Concrete examples of nitrile group contained monomer are acrylonitrile, methacrylonitrile, and the like; and among all, acrylonitrile is preferable in order to enhance binding property and improve electrode strength. Content of acrylonitrile in monomer mixture during copolymerization is generally 0.1 to 40 parts by weight, preferably 0.5 to 30 parts by weight and more preferably 1 to 20 parts by weight, with respect to 100 parts by weight of a compound shown by the general expression (1). When content of acrylonitrile is within the above range, adhesion with current collector becomes superior and the obtained electrode strength improves.

A dissolved-type binding agent other than the above-mentioned binding agent generally includes: vinyl polymers such as polyethylene, polypropylene, polyisobutylene, polyvinyl chloride, polyvinylidene chloride, polyvinylidene fluoride, polytetrafluoroethylene, polyvinyl acetate, polyvinyl alcohol, polyvinyl isobutyl ether, polyacrylonitrile, polymethacrylonitrile, polymethylmethacrylate, polymethylacrylate, polyethyl methacrylate, allyl acetate and polystyrene, diene polymers such as polybutadiene and polyisoprene, ether polymers having hetero atom at its main chain such as polyoxymethylene, polyoxyethylene, polycyclic thioether and polydimethylsiloxane, a condensed ester polymers such as polylactone, polycyclic anhydride, polyethylene terephthalate and polycarbonate, a condensed amide polymers such as nylon 6, nylon 66, poly-m-phenyleneisophthalamide, poly-p-phenyleneterephthalamide and polypyromellitimide, and the like.

A shape of a binding agent is not particularly limited; however, it is preferably a particulate state since adhesion with current collector is good and capacity decrease of the formed electrode, as well as deterioration due to a repeat of discharge and charge can be prevented. A water dispersible binding agent of the particulate state includes a dispersion of binding agent particles in water like latex, or powdered state obtained by drying such dispersion liquid.

Glass-transition temperature (Tg) of a binding agent is preferably 50° C. or less, and more preferably −40 to 0° C. When glass-transition temperature (Tg) of a binding agent is within this range, with a small amount of use, adhesion becomes superior, electrode strength becomes strong, flexibility becomes excellent, and electrode density can be easily heightened by a press step of electrode at its formation.

Number average particle diameter, when binding agent is a dispersible binding agent, is not particularly limited; however, it is generally 0.0001 to 100 μm, preferably 0.001 to 10 μm, and more preferably 0.01 to 1 μm. When number average particle diameter of binding agent is within this range, an excellent adhesive force can be provided to electrode composition layer even with a small amount of use. Note that number average particle diameter is obtained by measuring diameters of 100 binding agent particles randomly-selected with transmission electron microscope micrograph, and calculating their arithmetic mean value as number average particle diameter. Particle shape may be either spherical or deformed. These binding agents can be used individually or with a combination of two kinds or more.

Amount of a binding agent is generally 0.1 to 50 parts by weight, preferably 0.5 to 20 parts by weight, and more preferably 1 to 10 parts by weight, with respect to 100 parts by weight of an electrode active material. When an amount of binding agent is within this range, adhesion between the obtained electrode composition layer and current collector can be sufficiently secured, capacity of electrochemical element can be heightened, and internal resistance can be lowered.

Non-aqueous solvent dissolving the binding agent includes: carbon hydrides such as n-hexane, n-heptane and cyclohexane, aromatic hydrocarbons such as toluene, xylene and cyclopentane, ketones such as acetone, ethyl methyl ketone and cyclohexanone, esters such as methyl acetate, ethyl acetate, n-butyl acetate, butyl cellosolve acetate, butyl carbitol acetate, ethyl cellosolve acetate and ethyl carbitol acetate, lactones such as γ-butyrolactone and ε-caprolactone, ashironitriles such as acetonitrile and propionitrile, ethers such as tetrahydrofuran, ethylene glycol diethyl ether and cyclopentylmethyl ether, carbonates such as propylenecarbonate, amides such as N-methylpyrrolidone and N,N-dimethylformamide, ureas such as N,N-dimethylethylene urea, N,N-dimethylpropylen urea and tetramethyl urea, sulfoxides such as dimethylsulfoxide, and sulfones such as sulfolane and the like. Among all, toluene, cyclopentylmethyl ether, and the like are preferable according to the present invention, due to a low drying temperature and a high reactivity with lithium particle powder during granulation step, mentioned hereinafter. These solvents can be used alone or in a combination of 2 or more kinds with an arbitrary ratio.

<An Alkaline Metal Powder or an Alkaline Earth Metal Powder Each Having a Coated Surface>

According to the manufacturing method of an electrode for an electrochemical element of the present invention, alkaline metal powder having a coated surface or alkaline earth metal powder having a coated surface can be used. With the coated surface of an alkaline metal powder or an alkaline earth metal powder, deterioration (oxidation) of the alkaline metal powder or the alkaline earth metal powder during manufacturing step of electrode can be prevented and predoping time of alkaline metal or alkaline earth metal can be stabilized. Thus, in spite of having effects (an increased capacity of an electrochemical element) of predoping using an alkaline metal powder or an alkaline earth metal, reductions of an electrode peeling strength, electrochemical element productivity, internal resistance and charge-discharge cycle characteristic can be prevented.

An alkaline metal powder or an alkaline earth metal powder is not particularly limited; and in concrete, lithium or sodium is preferable, and lithium is more preferable.

A coated surface of an alkaline metal powder or an alkaline earth metal powder is not particularly limited, as long as it does not react with the alkaline metal powder or the alkaline earth metal powder, and can prevent a contact between external air and the alkaline metal powder or the alkaline earth metal powder. In concrete, surface can be coated using lithium carbonate, wax, polymer or so. Among all, polymer is preferable since it can swell to electrolyte and block a contact between an alkaline metal powder or an alkaline earth metal powder and water.

Polymer coating a surface of an alkaline metal powder or an alkaline earth metal powder (hereinafter, may be mentioned as "coat polymer") exemplifies diene polymer, acrylate polymer, fluorine polymer, and their mixture. The above-mentioned binding agent examples can be used, and diene polymer, polymethylmethacrylate and polystyrene can be preferably used. With the use of the above-mentioned polymers, during manufacturing step of electrode, a contact between an alkaline metal powder or an alkaline earth metal powder and moisture can be blocked, and thus deterioration can be prevented. In addition, with the use of the above-mentioned polymers, said polymer is likely to swell in electrolyte during manufacturing step of an electrochemical element, and a lithium ion is likely to dope and undope, and thus, a good electrochemical element can be obtained.

Further, polymers wherein difference between solubility parameter (SP value) and the SP value of a solvent used for the after-mentioned electrolyte of an electrochemical element is within a range of preferably 0.3 to 5.0 $(cal/cm^3)^{1/2}$, more preferably 0.5 to 3.0 $(cal/cm^3)^{1/2}$ and the most preferably 0.5 to 2.0 $(cal/cm^3)^{1/2}$, are preferably used. With the use of such polymers, predoping time of electrode can be shortened, electrolyte viscosity can be inhibited and internal resistance of electrochemical element can be reduced. When difference between solubility parameter (SP value) of coat polymer and that of a solvent used for the after-mentioned electrolyte of the electrochemical element is smaller than the above range, coat polymer may be dissolved to a solvent used for electrolyte causing viscosity increase of electrolyte and resistance of an electrochemical element may be increased. When difference between solubility parameter (SP value) of coat polymer and that of a solvent used for the after-mentioned electrolyte of the electrochemical element is larger than the above range, coat polymer may not swell and may not express functions of an electrochemical element.

Further, polymers wherein difference between solubility parameter (SP value) of a coat polymer and that of non-aqueous solvent used for preparing the after-mentioned composite particles (B) is within a range of preferably 0.5 to 5.0 $(cal/cm^3)^{1/2}$, more preferably 1.0 to 4.0 $(cal/cm^3)^{1/2}$ and the most preferably 1.5 to 3.0 $(cal/cm^3)^{1/2}$, are preferably used. Within the above range, strength of composite particles (B) can be improved and the peeling strength of an electrochemical element can be heightened. When lower than the above range, polymer will be dissolved to non-aqueous solvent when preparing composite particles (B) and an alkaline metal powder or an alkaline earth metal powder will be exposed and deteriorated; thus, lifetime characteristic of an electrochemical element may be deteriorated. When higher than the above range, polymer is not included in a non-aqueous solvent when preparing composite particles (B), and strength of composite particles (B) may be reduced.

Note that SP value of solvent used for electrolyte and that of non-aqueous solvent can be obtained by the method described in "Polymer Handbook" VII Solubility Parament Values, pp 519-559 edited by J. Brandrup and E. H. Immergut (John Wiley & Sons, the third edition, published in 1989). When used as a mixed medium combining 2 or more kinds of fluid media, its SP value can be calculated from SP value of individual fluid medium and their mixed mole ratio.

Although SP value of a coat polymer can be obtained from the method described in the above "Polymer Handbook", SP value of materials that are not described in this publication can be obtained in accordance with "molecular attraction constant method" suggested by Small. This method is obtained from a characteristic value of functional group (atomic group) constituting compound molecule, namely, a method obtained from SP value (δ) in accordance with the following formula (1) using a total of molecular attraction constant (G) and molecular volume.

[Formula 1]

$$\delta = \Sigma G/V = d\Sigma G/M \quad (1)$$

ΣG: a total of molecular attraction constant G
V: specific volume
M: molecular weight
d: specific weight In addition, glass-transition temperature (Tg) of coat polymer is preferably within a range of 50 to 150° C., more preferably 70 to 150° C., and the most preferably 80 to 150° C. By setting Tg of a polymer within the above range, an electrode peeling strength improves and an uniform electrode can be manufactured.

A coated film thickness of an alkaline metal powder or an alkaline earth metal powder each having a coated surface is preferably 1 to 200 nm, more preferably 10 to 100 nm, and the most preferably 10 to 50 nm. When said coated film thickness is within the above-range, predoping time can be shortened and thus, productivity of a battery improves and deterioration of an alkaline metal powder or an alkaline earth metal powder can be inhibited by preventing a reaction between circumference atmosphere (external air) and the alkaline metal powder or the alkaline earth metal powder.

A surface coating method of an alkaline metal powder or an alkaline earth metal powder is not particularly limited; and a method wherein an alkaline metal powder or an alkaline earth metal powder, coat polymer and the like are heated and stirred, a method wherein a molten material of an alkaline metal powder or an alkaline earth metal powder is stirred and liquid solution of coat polymer is added, a method wherein a dispersion liquid of alkaline metal or alkaline earth metal in oil and a liquid solution of coat polymer are stirred, and the like are exemplified.

Additive amount of coat polymer to an alkaline metal powder or an alkaline earth metal powder is preferably 0.3 to 20 parts by weight and more preferably 0.5 to 15 parts by weight with respect to 100 parts by weight of an alkaline metal powder or an alkaline earth metal powder. When an additive amount of coat polymer with respect to an alkaline metal powder or an alkaline earth metal powder is within the above range, a desired thickness of coating film can be formed.

A mean volume particle diameter of an alkaline metal powder or an alkaline earth metal powder each having a coated surface is preferably 1 to 100 μm, more preferably 2 to 100 μm, and the most preferably 10 to 100 μm. When said mean volume particle diameter of an alkaline metal powder or an alkaline earth metal powder is within the above range, the alkaline metal powder or the alkaline earth metal powder can be uniformly dispersed in electrode; and thus, predoping time is shortened. As a result, productivity of a battery improves. In addition, film thickness of an electrode composition layer can be uniform. When said mean volume particle diameter of the alkaline metal powder or the alkaline earth metal powder each having a coated surface is larger than the above range, predoping time may be lengthened. While when said mean volume particle diameter is smaller than the above range, handling of powders becomes complicated and a charge-discharge cycle characteristic of an electrochemical element may be deteriorated.

An additive amount of an alkaline metal powder or an alkaline earth metal powder each having a coated surface with respect to 100 parts by weight of composite particles (A) or (B) is 0.01 to A parts by weight and preferably 0.1 to B parts by weight. When the additive amount of an alkaline metal powder or an alkaline earth metal powder each having a coated surface is within the above range, irreversible capacity of an electrochemical element can be reduced and capacity can be improved.

Note that "A" is 100 times in value of an initial charging capacity (mAh/g) of an electrode active material used for preparation of composite particles (A) or (B) divided by a theoretical electrical capacitance (mAh/g) of an alkaline metal powder or an alkaline earth metal powder.

"B" is 120 times in value of an irreversible capacity (mAh/g) of an electrode active material used for preparation of composite particles (A) or (B). Note "A" and "B" satisfy the range of 0.1≤B≤A.

Further, an additive amount of an alkaline metal powder or an alkaline earth metal powder each having a coated surface with respect to 100 parts by weight of an electrode active material is preferably 0.01 to 100 parts by weight.

In concrete, when using lithium as alkaline metal powder and graphitized material as an electrode active material, an additive amount of alkaline metal powder having a coated surface with respect to 100 parts by weight of an electrode active material is preferably 0.01 to 10 parts by weight.

Further, when using lithium as an alkaline metal powder and graphitizable or non-graphitizable carbon as an electrode active material, an additive amount of alkaline metal powder having a coated surface with respect to 100 parts by weight of an electrode active material is preferably 0.05 to 15 parts by weight.

Further, when using lithium as an alkaline metal powder and an alloy-based active material, such as Si, Sn, Si—O—C, SiC, as an electrode active material, an additive amount of alkaline metal powder having a coated surface with respect to 100 parts by weight of an electrode active material is preferably 1 to 50 parts by weight.

Further, when using lithium as an alkaline metal powder and a lithium containing metal composite oxide, such as $Li_4Ti_5O_{12}$, $Li_4Mn_5O_2$, $LiCoO_2$, $LiNiO_2$, $LiMnO_2$, $LiMn_2O_4$, $LiFePO_4$ and $LiFeVO_4$, an additive amount of alkaline metal powder having a coated surface with respect to 100 parts by weight of an electrode active material is preferably 0.01 to 1 part by weight.

And, when using lithium as an alkaline metal powder and a transition metal oxide, such as $P_2O_5$, $MoO_3$, $V_2O_5$ and $V_6O_{13}$, an additive amount of alkaline metal powder having a coated surface with respect to 100 parts by weight an electrode active material is preferably 1 to 15 parts by weight.

An initial charging capacity (mAh/g) of an electrode active material is obtained by manufacturing a double polar cell using an electrode active material as a working pole and alkaline metal or alkaline earth metal as the opposite pole and dividing current capacity (mAh), obtained by charging to a predetermined potential (e.g. 4.2 V when using $LiCoO_2$ as an electrode active material for positive electrode, 3.8 V when using active carbon (carbonaceous material) and 0.02 V when using graphite as an electrode active material for negative electrode), by weight (g) of an electrode active material.

Irreversible capacity (mAh/g) of an electrode active material is calculated by dividing current capacity (mAh), obtained when discharged to a predetermined potential, with an electrode active material weight (g) and calculating the difference from an initial charging capacity.

A theoretical electrical capacitance (mAh/g) of an alkaline metal powder or an alkaline earth metal powder is a value, in which an electric quantity (coulomb) during oxidizing to monovalent cation, when said alkaline metal or alkaline earth metal is an alkaline metal, and to divalent cation, when an alkaline earth metal, is expressed by current capacity (mAh/g) of the alkaline metal or alkaline earth metal per weight. For instance, theoretical capacity is 3861 mAh/g when alkaline metal is Li, 1166 mAh/g when Na, and 2205 mAh/g when alkaline earth metal powder is Mg.

<Composite Particles (A)>

Composite particles (A) include the above-mentioned electrode active material and water dispersible binding agent; and they are integrated particles of the electrode active material and the water dispersible binding agent. In said composite particles (A) according to the present invention, an electrode active material and a water dispersible binding agent do not exist individually independent to each other, but form a particle by 2 components or more including the electrode active material and the water dispersible binding agent, which are its structural components. In concrete, it is preferable that a plural number of individual particles of the above 2 components or more are combined forming a secondary particle; and a plural number (preferably several to several tens) of an electrode active material are bound by a water dispersible binding agent forming particles. Note that composite particles (A) may include a conductive agent, a dissolve type resin and the other additives when required, in addition to an electrode active material and a water dispersible binding agent.

(Conductive Agent)

Composite particles (A) may include a conductive agent. Said conductive agents are conductive, comprise carbon allotropes of a particulate state without fine pores which can form an electric double layer, and improve conductivity of an electrode for an electrochemical element. Weight average particle diameter of conductive agent is smaller than that of an electrode active material; and it is within a range of generally 0.001 to 10 μm, preferably 0.05 to 5 μm, and more preferably 0.01 to 1 μm. When particle diameter of the conductive agent is within this range, a high conductivity can be obtained with less amount of use. As the conductive agent, in concrete, conductive carbon black such as furnace black, acetylene black and ketjen black (a registered trademark of Akzo Nobel Chemicals Besloten Vennootschap), graphite such as natural graphite, and a synthetic graphite are exemplified. Among all, a conductive carbon black is preferable, and acetylene black and furnace black are more preferable. These conductive agents can be used alone or in a combination of 2 or more kinds.

Content of conductive agent in composite particles (A) is within a range of preferably 0.1 to 50 parts by weight, more preferably 0.5 to 15 parts by weight, and the most preferably 1 to 10 parts by weight, with respect to 100 parts by weight of an electrode active material. When amount of conductive agent is within this range, capacity of an electrochemical element using the obtained electrode can be heightened and internal resistance can be lowered.

(A Dissolve Type Resin)

A dissolve type resin may be included in composite particles (A). Such dissolve type resin is a resin dissolved to solvent; and suitably, it uniformly disperses such as an electrode active material and a conductive agent, added when required, to solvent. A dissolve type resin may bind an electrode active material and a conductive agent. The dissolve type resin is preferably a resin dissolved to water, and in concrete; cellulose polymer such as carboxymethyl cellulose, methyl cellulose, ethyl cellulose and hydroxypropyl cellulose, and their ammonium salts and alkaline metal salts; poly (meth)acrylate such as poly(meth)sodium acrylate; polyvinyl alcohol, modified polyvinyl alcohol and polyethylene oxide; polyvinylpyrrolidone, polycarboxylic acid, oxidized starch, phosphate starch, casein, various modified starch, chitin and chitosan derivatives thereof and the like are exemplified. These dissolve type resins can be used alone or in a combination of 2 or more kinds. Among all, cellulose polymer is preferable, and carboxymethyl cellulose, their ammonium salts or their alkaline metal salts are particularly preferable.

Content of said dissolve type resin in composite particles (A) is within a range of preferably 0.1 to 10 parts by weight, more preferably 0.5 to 5 parts by weight, and the most preferably 0.8 to 2 parts by weight, with respect to 100 parts by weight of an electrode active material. By the use of said dissolve type resin, sediment or aggregation of solid content in slurry can be inhibited. In addition, clogging of atomizer when spray drying can be prevented and thus, spray drying can be steadily and continuously performed.

(The Other Additives)

Composite particles (A) may include the other additives. The other additives include such as surfactant. The surfactant includes anionic, cationic, nonionic and ampholytic surfactant such as nonionic anion. And above all, anionic or nonionic surfactant, which make thermal decomposition easy, are preferable.

Content of the surfactant in composite particles (A) is within a range of preferably 0 to 50 parts by weight, more preferably 0.1 to 10 parts by weight, and the most preferably 0.5 to 5 parts by weight, with respect to 100 parts by weight of an electrode active material.

Weight average particle diameter of composite particles (A) is preferably 5 to 500 μm, more preferably 7 to 300 μm, and the most preferably 10 to 100 μm.

<Composite Particles (B)>

Composite particles (B) include the above-mentioned electrode active material, binding agent (preferably a dissolved-type binding agent) and an alkaline metal powder or an alkaline earth metal powder each having a coated surface. In said composite particles (B) according to the present invention, an electrode active material, a binding agent and an alkaline metal powder or an alkaline earth metal powder each having a coated surface do not exist individually independent to each other, but form a particle by 3 components or more including an electrode active material, a binding agent and an alkaline metal powder or an alkaline earth metal powder each having a coated surface, which are its structural components. In concrete, it is preferable that a plural number of individual particles including the above 3 components or more are combined forming a secondary particle; and a plural number (preferably several to several tens) of an electrode active material and an alkaline metal powder or an alkaline earth metal powder each having a coated surface are bound by a binding agent forming particles. Note that composite particles (B) may include a conductive agent and the other additives when required, in addition to the above components. Kind and amount of the conductive agent or the other additives are the same with the conductive agent or the other additives used for the above-mentioned composite particles (A)

Weight average particle diameter of composite particles (B) is preferably 5 to 500 μm, more preferably 7 to 300 μm and the most preferably 10 to 100 μm.

<Current Collector>

Kind of materials constituting current collector is metal, carbon, conductive polymer and the like, and metal is preferably used. For instance, various materials suggested for the use of battery or capacitor can be used. Aluminum, stainless and the like are preferably used for positive electrode of current collector, and stainless, copper, nickel and the like for negative electrode of current collector. Current collector may have a structure without a through-hole or with a through-hole. Examples of current collector with a through-hole (hereinafter, may be mentioned as "a hole open current collector") are preferably, for instance, expanded metal, punching metal, metal mesh, foam, etching foil wherein a through-hole is provided by etching, current collector with protrusion wherein a protrusion and a through-hole are provided by Emboss-Roll, and the like.

Shape of hole open part of the hole open current collector is not particularly limited; and open area ratio is within a range of preferably 10 to 90%, more preferably 20 to 60%, and the most preferably 40 to 60%. The open area ratio can be obtained by a planar observation of a hole open current collector. In concrete, open area ratio is determined by planar observing the hole open current collector and calculating an area of through-hole per unit area.

When open area ratio of hole open current collector is within the above-range, a capacity variation between lots when manufacturing an electrochemical element can be prevented. With a normal electrochemical element using current collector without hole open part, non-opposing surface, wherein electrodes do not oppose to each other, may be formed when manufacturing a multilayer electrochemical element; and thus, electric capacity cannot be taken out from said non-opposing surface. Further, when variations of active material amount per unit area of electrode generate, actually taken out electric capacity may be smaller than electric capacity calculated from weight of active material amount, which may cause deterioration of an electrochemical element. Due to this, capacity variations may generate between lots of an electrochemical element and lifetime of electrochemical element may be shortened. This is because, electrolyte ion diffusion only occur at opposing surfaces of positive and negative electrodes. However, electrolyte ion passes current collector and diffuses when using the hole open current collector; and thus, electric capacity can be taken out from non-opposing surface, wherein electrodes do not oppose. Further, even when electrodes having different active material amount per unit area of the electrodes are used, capacity in capacitor cell can be easily balanced, and that capacity variations between lots of an electrochemical element can be prevented. In addition, an electric charge bias in cell does not generate and lifetime of an electrochemical element can be lengthened.

In addition, when open area ratio of current collector is too high for supporting lithium to negative electrode active material, time required for the support is short and unevenness for supporting lithium is unlikely to generate; however, current collector strength may be reduced, wrinkles on electrode may generate, and electrode may be cut. Further, it may become difficult to hold active materials and the like to through-hole; and problems such as a reduction of yield ratio and the like may be caused when manufacturing electrode, by fall of active materials and the like, cut of electrode, and so on.

On the other hand, when open area ratio is too low, a time required for negative electrode active material to support lithium may be lengthened; and thus, problems such as reduction of production efficiency, variation increase of cell characteristics and the like may be caused. However, current collector strength may be improved and a fall of active material is unlikely to generate, which improves yield ratio of electrode. An open area ratio or a hole diameter of current collector is suitably determined within the above-range considering battery structure (a multilayer type, a winding type, and so on) and productivity.

Current collector is a band-like form; and although its thickness is not particularly limited, it is preferably 5 to 50 μm, and more preferably 10 to 40 μm. Width is also not particularly limited; however, it is preferably 100 to 1000 mm, more preferably 200 to 500 mm.

(Conductive Adhesive Layer)

Further, conductive adhesive layer is preferably formed on at least one surface of current collector. Namely, an electrode composition layer is formed on a surface of current collector via conductive adhesive layer. Binding strength between electrode composition layer and current collector can be improved by forming conductive adhesive layer on at least one surface of current collector.

A conductive adhesive layer includes conductive material, preferably carbon powder, and when required, resin compounds. With the inclusion of resin components in conductive adhesive layer, an adhesion between current collector and electrode composition layer can be heightened, internal resistance of an electrochemical element can be reduced, and output density can be improved.

Resin components used in conductive adhesive layer when required are the same with the above-mentioned binding agent. The resin components exemplify high-molecular compounds such as fluorine polymer, diene polymer, acrylate polymer, polyimide, polyamide, polyurethane and the like; and fluorine polymer, diene polymer or acrylate polymer is preferable, and diene polymer or acrylate polymer is more preferable, since voltage resistance can be increased and energy density of electrochemical element can be increased.

Content of resin components in conductive adhesive layer is preferably 0.5 to 20 parts by weight, more preferably 1 to 15 parts by weight, and the most preferably 2 to 10 parts by weight, with respect to 100 parts by weight of conductive materials.

Conductive adhesive layer include conductive material and, when required, resin components, and may include dispersing agent for uniformly dispersing thereof. Concrete examples of the dispersing agent are the same with the examples of the above-mentioned dissolve type resin. Among all, cellulose polymer is preferable and carboxymethyl cellulose, ammonium salts thereof or alkaline metal salts thereof are the most preferable.

Although the used amount of these dispersing agents is not particularly limited as long as it does not undermine the efficiency of the present invention, it is generally 0.1 to 15 parts by weight, preferably 0.5 to 10 parts by weight and the most preferably 0.5 to 8 parts by weight, with respect to 100 parts by weight of conductive material.

(Carbon Powder)

Carbon powder preferably used for conductive material of conductive adhesive layer exemplifies: a graphite with high conductivity by the presence of delocalized π electron (in concrete, natural graphite, synthetic graphite and the like); spherical aggregate of carbon black in which turbostratic structure is formed by collecting several layers of graphite type carbonfine crystals (in concrete, acetylene black, ketjen black, the other furnace black, channel black, thermal lamp black and the like); carbon fiber, carbon whisker and the like. Among all, graphite and carbon black are preferable since carbon powder of conductive adhesive layer is densely filled up, electron transfer resistance can be reduced, and further, internal resistance of electrochemical element can be reduced.

The above exemplified carbon powder can be used alone or in a combination of 2 kinds or more. In concrete, graphite and carbon black, graphite and carbon fiber, graphite and carbon whisker, carbon black and carbon fiber, carbon black and carbon whisker and the like are exemplified. Among all, a combination of graphite and carbon black, graphite and carbon fiber, and carbon black and carbon fiber are preferable, and a combination of graphite and carbon black, and graphite and carbon fiber are the most preferable. With the use of these combinations of carbon powder, electron transfer resistance and internal resistance of an electrochemical element are reduced, since carbon powder of conductive adhesive layer is densely fill up.

Electric resistivity of carbon powder is preferably 0.0001 to 1 Ω·cm, more preferably 0.0005 to 0.5 Ω·cm, and the most preferably 0.001 to 0.1 Ω·cm. When electric resistivity of carbon powder is within this range, electron transfer resistance of conductive adhesive layer and internal resistance can be reduced. Note that electric resistivity is obtained by using powder resistance measurement system (MCP-PD51 by Dia Instruments Co., Ltd.), measuring resistance value by continuously pressuring carbon powder, and calculating electric resistivity; $\rho$ (Ω·cm)=R×(S/d) using resistance value R (a), converged with respect to pressure, area S ($cm^2$) of compressed carbon powder layer, and thickness d (cm).

A mean volume particle diameter of carbon powder is preferably 0.01 to 20 µm, more preferably 0.05 to 15 µm, and the most preferably 0.1 to 10 µm. When mean volume particle diameter of carbon powder is within this range, carbon powder of conductive adhesive layer is densely filled; and thus, electron transfer resistance as well as internal resistance of electrochemical element is reduced. A mean volume particle diameter is calculated from measurements of laser diffraction particle size analyzer (SALD-3100 by Shimadzu Corporation).

Hereinafter, a manufacturing method of an electrode for an electrochemical element according to the present invention will be described in detail.

The first manufacturing method of an electrode for an electrochemical element according to the present invention comprises (1A) a preparing step of composite particles (A) including an electrode active material and a water dispersible binding agent, (2A) a preparing step of mixed powder by dry mixing composite particles (A) and an alkaline metal powder or an alkaline earth metal powder each having a coated surface, (3A) a foaming step of electrode composition layer by compression forming said mixed powder, and (4A) an integration step of said electrode composition layer and current collector.

[A Manufacturing Method of Composite Particles (A) ((1A) a Preparing Step f Composite Particles (A))]

A manufacturing method of composite particles (A) is not particularly limited; and can be manufactured by granulation methods such as a wet granulation method, a spray drying granulation method, a rolling layer granulation method, a compressed granulation method, a stirred-type granulation method, a molten granulation method, and the like. Among all, a wet granulation method and a spray drying granulation method are preferable, and a spray drying granulation method is more preferable. According to the above manufacturing method of composite particles (A), slurry is easily dried and lifetime characteristic of an electrochemical element can be improved. In addition, with the above granulation methods, composite particles (A) which is spherical and has an excellent fluidity can be obtained; and thus, uniform electrode composition layer can be formed as well as lifetime characteristic of electrochemical element can be improved.

In concrete, composite particles (A) are preferably obtained by the following 2 manufacturing methods.

The first manufacturing method of composite particles (A) is a manufacturing method of a wet granulation method; comprising a slurry preparation step wherein a water dispersible binding agent, and when required, conductive agent and the other additives, are mixed in a solvent; a fluid granulation step wherein an electrode active material is fluidized and the above slurry is sprayed thereon; a rolling granulation step of the obtained particles by the fluid granulation step, and a heat treating step.

First, slurry including a water dispersible binding agent, and when required, conductive agent, a dissolve type resin and the other additives is obtained. Solvent used to obtain slurry is water, which is the most preferable, but may be an organic solvent. The organic solvent exemplifies alkyl alcohol such as methyl alcohol, ethyl alcohol, propyl alcohol or so; alkyl ketone such as acetone, methyl ethyl ketone or so; ether such as tetrahydrofuran, dioxane, diglyme or so; amide such as diethylformamide, dimethylacetamide, N-methyl-2-pyrolidone (hereinafter, may be referred to as "NMP"), dimethylimidazolidinone or so; and sulfur solvent such as dimethylsulfoxide, sulfolane or so. And among all, alkyl alcohol is preferable. Combination use of an organic solvent, which has a lower boiling point than that of water, fasten the drying rate when fluid granulating. In addition, combination use of an organic solvent, which has a lower boiling point than that of water, allow dispersibility of water dispersible binding agent and solubility of a dissolve type resin to change, and viscosity and fluidity of slurry can be adjusted by amount and kind of the used solvent. Thus, production efficiency can be improved.

Solvent amount used for preparing slurry is an amount wherein solid content concentration is within a range of generally 1 to 50 wt %, preferable 5 to 50 wt %, and the most preferably 10 to 30 wt %. It is preferable for a uniform disperse of water dispersible binding agent, when solvent amount is within this range.

A method or a procedure to disperse or dissolve water dispersible binding agent and, when required, conductive agent, a dissolve type resin and the other additives to solvent is not particularly limited; and it exemplifies a method wherein a water dispersible binding agent, conductive agent, dissolve type resin and the other additives are added to solvent and mixed thereof; a method wherein a water dispersible binding agent, such as latex, dispersed to the solvent is added, after dissolving a dissolved type resin to a solvent, and lastly, a conductive agent and the other additives are added and mixed; a method wherein a conductive agent is added to a dissolve type resin dissolved to solvent, and mixed, and then water dispersible binding agent dispersed to a solvent is added thereof and mixed, and the like. Mixing measure exemplifies a mixture device such as ball mill, sand mill, beads mill, pigment disperser, stone mill, ultrasonic disperser, homogenizer, planetary mixer and so on. The mixture is generally performed at within a range of a room temperature to 80° C. for 10 minutes to several hours.

Next, an electrode active material is fluidized and the above-mentioned slurry is sprayed thereon, and then it is fluid granulated. A fluid granulation exemplifies a method done by a fluid layer, a deformed fluid layer, a jet layer and the like. A method done by a fluid layer is a method to perform an aggregated granulation by fluidizing an electrode active material by heated air and spraying the above-mentioned slurry thereon. A method done by a deformed fluid layer is the same with that of the fluid layer; and is a method to provide circulating flow to powders in layer and to emit relatively largely grown granulated materials with the use of classifier efficiency. A method done by a jet layer is a granulation method wherein slurry is adhered to coarse particles by a spray and the like with the use of a characteristic of the jet layer, and dried at the same time. A manufacturing method of composite particles (A) according to the present invention is preferably a method done by fluid layer or a deformed fluid layer out of said 3 methods.

Although a temperature of the spraying slurry is generally a room temperature, it may be warmed to a room temperature or more. Temperature of a heated air used for fluidization is generally 70 to 300° C., preferably 80 to 200° C.

Although particles (hereinafter, mentioned as "precursor particles") obtained by the fluid granulation may be completely dried by heated air, it is preferably in a wet-state, in order to raise granulation efficiency of the next rolling granulation step.

Next, precursor particles obtained by the above mentioned fluid granulation step are roll-granulated. Said rolling granulation includes a rotating plate method, a rotating cylinder method, a rotating truncated-cone method and the like. Rotating plate method is performed by generating aggregated granulation materials by spraying a water dispersible binding agent or the above slurry, when required, to the precursor particles supplied in an inclined rotating plate, and then emitting relatively largely grown granulation materials from rim with the use of classifier efficiency of the rotating plate. Rotating cylinder method is performed to obtain aggregated granulation materials by supplying wet precursor particles to an inclined rotating cylinder and roll moving said particles in the cylinder, and then spraying a water dispersible binding agent or the above slurry, when required. A rotating truncated-cone method is the same with the operation method using rotating cylinder, except emits a relatively largely grown granulation materials with the use of classifier efficiency by aggregated granulation materials by the truncated-cone shape.

Temperature when rolling granulation is performed is not particularly limited; however, in order to remove solvent of the slurry, it is generally 80 to 300° C. and preferably 100 to 200° C. Further, in order to harden a surface of composite particles, it is heat treated. Heat treating temperature is generally 80 to 300° C.

By the manufacturing methods above, composite particles (A) including an electrode active material, a water dispersible binding agent and when necessary, conductive agent, a dissolve type resin and the other additives are obtained.

The second manufacturing method of composite particles (A) comprises: a slurry preparation step wherein the slurry includes an electrode active material, a water dispersible binding agent and, when required, conductive agent, a dissolve type resin and the other additives; and a spray granulation step wherein the slurry is spray dried First, an electrode active material, a water dispersible binding agent and, when required, conductive agent, a dissolve type resin and the other additives are dispersed or dissolved in solvent; and an electrode active material, a water dispersible binding agent and, when required, conductive agent, a dissolve type resin and the other additives dispersed or dissolved solvent is obtained. Solvent used for preparing the slurry can be the same exemplified in the first manufacturing method mentioned above. Solvent amount used for preparing slurry is an amount wherein solid content concentration is within a range of generally 1 to 50 wt %, preferable 5 to 50 wt %, and the most preferably 10 to 30 wt %.

A method or a procedure to disperse or dissolve electrode active material, water dispersible binding agent and, when required, conductive agent, a dissolve type resin and the other additives to solvent is not particularly limited; and exemplifies a method wherein an electrode active material, a water dispersible binding agent and, when required, conductive agent, a dissolve type resin and the other additives are added to solvent and mixed thereof a method wherein a water dispersible binding agent, such as latex, dispersed to the solvent is added, after dissolving a dissolved type resin to a solvent, and lastly, electrode active material and conductive agent are added and mixed; a method wherein electrode active material and conductive agent are added to water dispersible binding agent dispersed to a solvent, and then mixed thereof, and a dissolve type resin dissolved to solvent is added and mixed. Mixing measure exemplifies a mixture device such as ball mill, sand mill, beads mill, pigment disperser, stone mill, ultrasonic disperser, homogenizer, planetary mixer and so on.

The mixture is generally performed at within a range of a room temperature to 80° C. for 10 minutes to several hours.

Next, granulation is performed to the above slurry by a spray drying method. A spray drying method is a method wherein slurry is sprayed in heated air, and then dried. A representative example of device used for the spray drying method is atomizer. There are 2 kinds for this atomizer, using rotating disk method and pressurization method. Rotating disk method is performed by introducing slurry almost in the center of a fast rotating disk, throwing the slurry outside of the disk by centrifugal force of said disk, and at the same time, drying by making the slurry to a mist. Although rotary speed of disk depends on a size of the disk, it is generally 5,000 to 30,000 rpm and preferably 15,000 to 30,000 rpm. On the other hand, pressurization method is performed by pressurizing slurry and drying mist of said slurry from a nozzle.

Although a temperature of the spraying slurry is generally a room temperature, it may be warmed to a room temperature or more.

Temperature of heated air at the time of spray drying is generally 80 to 250° C., and preferably 100 to 200° C. Blowing method of a heated air in a spray drying method is not particularly limited: a method wherein a direction of heated air and that of spray are laterally parallel to each other; a method wherein it is sprayed at a drying overhead part, and then downwardly move together with heated air; a method wherein a drop of spray and heated air counter currently contact; and a method wherein, at first, a drop of spray and heated air flow in parallel, and then, counter currently contact to each other by a gravity fall of the drop, and so on are exemplified.

According to the second manufacturing method, in order to harden a surface of composite particles, it may be heat treated. Heat treating temperature is generally 80 to 300° C.

With the manufacturing method above, composite particles (A) including an electrode active material, a water dispersible binding agent and, when required, conductive agent, a dissolve type resin and the other additives can be obtained.

Composite particles (A) are mixed with the after-mentioned an alkaline metal powder or an alkaline earth metal powder each having a coated surface, and, when required, the other binding agent and the other additives; and the mixture is used for an electrode for an electrochemical element material (hereinafter, may be merely referred to as "electrode material") for forming an electrode composition layer.

Amount of composite particles (A) included in an electrode for an electrochemical element material is generally 50 wt % or more, preferably 70 wt % or more, and the most preferably 90 wt % or more.

The other binding agent included when required is the same with the water dispersible binding agent used when preparing the above-mentioned composite particles (A). Said composite particles (A) already include a water dispersible binding agent, and thus, it is not required to separately add the other binding agents; however, the other binding agents may be added when preparing electrode material in order to increase a binding force between composite particles (A) or that of composite particles (A) and an alkaline metal powder or an alkaline earth metal powder each having a coated surface. Amount of the other binding agent added when preparing electrode material, with a total of a water dispersible binding agent in composite particles (A), is generally 0.1 to 50 parts by weight, preferably 0.5 to 20 parts by weight, and more preferably 1 to 10 parts by weight, with respect to 100 parts by weight of an electrode active material. The other additives include shape forming aids such as water, alcohol, and so on; and they can be suitably selected and added in an amount which do not undermine the efficiency of the present invention.

Moisture amount of thus obtained composite particles (A) is preferably 400 ppm or less, and more preferably 100 ppm or less. By determining moisture amount of composite particles (A) within the above range, charge-discharge cycle characteristic of an electrochemical element can be improved.

[(2A) A Preparing Step of Mixed Powder by Dry Mixing Composite Particles (A) and an Alkaline Metal Powder or an Alkaline Earth Metal Powder Each Having a Coated Surface]

Next, composite particles (A) obtained by the above steps and an alkaline metal powder or an alkaline earth metal powder each having a coated surface are dry mixed; and a mixed powder is obtained. According to the present invention, "mixed powder" is a powdery mixture of the above composite particles (A) and an alkaline metal powder or an alkaline earth metal powder each having a coated surface. In addition, "dry mixing" according to the present invention determines a mixing of composite particles (A) and an alkaline metal powder or an alkaline earth metal powder each having a coated surface using a mixing device; and in concrete, a mixing with a solid content concentration during the mixture is 90 mass % or more, preferably 95 mass % or more, and the most preferably 97 mass % or more. Although dry mixing method is not particularly limited, a stirred mix method of composite particles (A) and an alkaline metal powder or an alkaline earth metal powder each having a coated surface using Henschel mixer, Omni mixer and the like, a mixing method using paint shaker, a mixing method in fluid layer, and the like are exemplified. Among all, a stirred mix method using Henschel mixer is preferable, since composite particles (A) and an alkaline metal powder or an alkaline earth metal powder each having a coated surface can be uniformly mixed. Preferable stirred condition at that time is a rotation number of 300 to 800 rpm for 10 to 30 min. When stirred mixed under such condition, composite particles (A) and an alkaline metal powder or an alkaline earth metal powder each having a coated surface can be uniformly mixed; and thus predoping time can be shortened. Further, a coated surface of an alkaline metal powder or an alkaline earth metal powder will not be removed, which prevents deterioration of powder and reduction of charge-discharge cycle characteristic of an electrochemical element.

Although atmosphere when dry mixing is not particularly limited, dew point is preferably −30° C. or less and more preferably −50° C. or less. When dew point is higher than −30° C., moisture content included in mixed powder increases and charge-discharge cycle characteristic of an electrochemical element will be deteriorated.

[(3A) a Foaming Step of Electrode Composition Layer by Compression Forming a Mixed Powder]

According to manufacturing method of an electrode for an electrochemical element, an electrode composition layer is obtained by compression forming the above-mentioned mixed powder. Compression forming method is a method in which densification is performed by rearrangement and deformation of electrode materials, with an application of pressure to electrode materials of mixed powder; and shape forming the electrode composition layer. Said compression forming method can be performed by simple equipment.

The compression forming method exemplifies a method wherein electrode material is supplied to a roll type compression forming device by a feeding device, such as screw feeder, and then an electrode composition layer is formed, a method wherein electrode material is dispersed on current collector or on substrate and the electrode material is smoothed such as by blade adjusting thickness, and then shape formed by a pressurization device, a method wherein electrode material is filled up in a metallic mold and said metallic mold is pressurized for a shape forming, and the like. Temperature when shape forming is preferably 0 to 200° C.

According to a manufacturing method of an electrode for an electrochemical element of the present invention, it is preferable to supply an electrode material to a roll type compression forming device by a supply device such as screw feeders and the like, and to shape form the electrode composition layer. With this method, an electrode composition layer is directly layered on current collector or on substrate, by sending current collector or the below-mentioned substrate to a roll at the same time electrode material is supplied; thus current collector with an electrode composition layer or substrate with an electrode composition layer can be obtained.

According to manufacturing method of an electrode for an electrochemical element of the present invention, an electrode composition layer can be formed on current collector; however, it is preferably formed on a substrate. With this formation of an electrode composition layer on substrate, more uniform electrode composition layer can be formed. As a result, uniform electrode for an electrochemical element can be manufactured, and that internal resistance of an electrochemical element can be inhibited and a charge-discharge cycle characteristic can be improved.

(Substrate)

Substrate according to the present invention is used to support an electrode composition layer, and to bond an electrode composition layer with current collector. Materials of substrate used in the present invention is not limited, and it can be such as inorganic material, organic material and the like, as long as an electrode composition layer can be formed on substrate. For instance, metal foil such as aluminum foil, copper foil and the like; plastic film; paper; thermoplastic resin film and the like can be exemplified. Further, a film of multi-layer structure in which the above films are stacked, can be used. Among all, in view of a general-purpose or handling, paper and thermoplastic resin film are preferable; and particularly among the paper and thermoplastic resin film, PET (polyethylene terephthalate) film, polyolefin film, PVA (polyvinyl alcohol) film, PVB (polyvinyl butyral film), PVC (polyvinyl chloride) film are preferable. Note that, substrate according to the present invention does not include current collector used in electrode.

A surface of substrate used in the present invention, contacting an electrode composition layer, is preferably roughened. When a surface of substrate contacting an electrode composition layer is roughened, it is adhered to an electrode composition layer due to an anchoring effect, and enables a wind-up roll. Further, when manufacturing electrode with the use of an electrode composition layer with substrate, the substrate can be easily detached from the electrode composition layer. A surface roughness Ra of a roughened surface substrate is within a range of preferably 0.1 to 5 μm, more preferably 0.2 to 3 μm, and the most preferably 0.2 to 1 μm. Both an adhesion between electrode composition layer and substrate and a detachability of substrate when manufacturing electrode using substrate with an electrode composition layer can be realized, when said surface roughness Ra of a roughened surface substrate is within this range. The surface roughness Ra can be obtained such as by, compliant to JIS B0601; 2003, drawing a coarse curve using such as a nanoscale hybrid microscope (VN-8010 by Keyence) and calculating using the below-mentioned formula (2). Within the below-mentioned formula (2), "L" is a measured length and "x" is a deviation from an average line to a measured curve.

[Formula 2]

$$Ra = \frac{1}{L}\int_0^L |f(x)| dx \quad (2)$$

A method to roughen substrate surface is not particularly limited; and a method to emboss substrate surface, a method to sandblast substrate surface, a method to knead mat material into a material constituting substrate, a method to coat a mat material including layer on substrate surface can be exemplified. Among all, in view of adhesion with an electrode composition layer, a method to sandblast substrate surface is preferable. A roughening treatment of substrate can be performed on one surface or can be performed on both surfaces.

A demolding treatment may be performed to a roughened surface of substrate. Although demolding treatment method is not particularly limited; it is preferable to use methods such as coating a thermoset resin such as alkyd resin on a substrate; coating a silicone resin on substrate and hardening thereof, coating fluorine resin on substrate, and the like. In particular, a demolding treatment using a thermoset resin, which can easily form uniform demolding treatment layer, is preferable. In addition, in view of a balance between shape formability of an electrode composition layer and detachability of substrate from the obtained substrate with an electrode composition layer, a demolding treatment by coating and hardening an alkyd resin is preferable.

Although thickness of substrate is not particularly limited; it is preferably 10 to 200 μm, more preferably 20 to 150 μm and the most preferably 20 to 100 μm. A take-up roll characteristic as well as a handling characteristic of substrate with an electrode composition layer improves, when thickness of substrate is within this range. In addition, although its width is also not particularly limited; it is preferably 100 to 1000 mm, and more preferably 100 to 500 mm.

Although tension strength of substrate is not particularly limited; it is preferably 30 to 500 MPa, and more preferably 30 to 300 MPa. When tension strength of substrate is within the above-range, a breaking of substrate with an electrode composition layer during manufacturing can be prevented.

Substrate used in the invention can be repeatedly used; and production cost of electrode can be reduced by the repeating use.

[(4A) an Integration Step of an Electrode Composition Layer and a Current Collector]

For no variations in thickness of a shape formed electrode composition layer and for a higher-capacity by increasing the density of an electrode composition layer, a posterior pressurization is further performed, integrating an electrode composition layer and current collector.

A posterior pressurization method is generally a press step by a roll (hereinafter, may be referred to as "a roll press step"). This roll press step is performed by setting two columnar rolls in parallel one above the other with a narrow distance, rotating each roll in opposite direction, and pressurizing an electrode composition layer and a current collector by setting between the rolls. The roll can be temperature regulated by heating, cooling and the like.

Further, in a case when an electrode composition layer is formed on substrate, it is preferable to laminate an electrode composition layer and a current collector, to paste by a hot press, to integrate said electrode composition layer and current collector, and then, to detach substrate from the electrode composition layer surface. By undergoing these steps, thickness of an electrode composition layer becomes more even and density of an electrode composition layer improves, and that a higher-capacity of an electrochemical element can be obtained. Hot press methods exemplify, in concrete, a batch-type hot press, a continuous hot roll press and the like; and above all, a continuous hot roll press is preferable due to a high productivity. Temperature of hot press is not particularly limited as long as it does not deteriorate the substrate; however, it is generally 50 to 200° C. and preferably 70 to 150° C. When temperature of hot press is within this range, an electrode composition layer can be uniformly bond to current collector, and is superior in electrode strength.

Although linear pressure of hot press is not particularly limited as long as it does not deteriorate substrate, it is generally 50 to 2,000 kN/m, preferably 100 to 1,000 kN/m, and the most preferably 200 to 500 kN/m. When linear pressure of hot press is within this range, an electrode composition layer can be uniformly bond to current collector, and is superior in electrode strength.

Although a method to detach substrate from an electrode composition layer is not particularly limited; however for instance, substrate is easily detached when an electrode composition layer pasted current collector and the substrate are wind to different rolls, after an electrode composition layer is adhered to current collector. Thus, an electrode composition layer and a current collector are integrated.

Considering such described series of steps, wherein an electrode composition layer is adhered to current collector and substrate is separated, a concrete embodiment will be further described in FIG. 1. Note that an electrode composition layer is not shown in FIGURE. An electrode composition layer is formed on a surface of substrate 1. In FIG. 1, a winding storage of the above-described substrate with an electrode composition layer 1 is fixed to unwinder 12 and substrate with an electrode composition layer 1 is released. Separately, a winding storage of current collector 2 is fixed to unwinder 14 and current collector is released. Next, substrate with an electrode composition layer 1 and current collector 2 are introduced to laminating machine 16, equipped with heating mechanism, and hot pressed; and then substrate with an electrode composition layer 1 is pasted to current collector 2. Then, substrate 1 is detached (separated) from an electrode composition layer and winded-up with winder 13, an electrode composition layer transferred current collector 2 is winded-up with winder 15, and then a winding storage of current collector with an electrode composition layer can be obtained.

In addition, an electrode composition layer formed substrate is hot pressed on the other surface of current collector, in which an electrode composition layer is formed, and bonded. And then, an electrode for an electrochemical element wherein electrode composition layers are formed on both surfaces of a current collector can be manufactured. Further, as shown in FIG. 1, electrode composition layers may be simultaneously formed on both surfaces of current collector by the method above.

The second manufacturing method of an electrode for an electrochemical element according to the present invention comprises (1B) a preparing step of composite particles (B) including an electrode active material, a binding agent, and an alkaline metal powder or an alkaline earth metal powder each having a coated surface, (2B) a foaming step of an electrode composition layer by compression forming said composite particles (B), and (3B) an integrating step of said electrode composition layer and current collector.

[A Manufacturing Method of Composite Particles (B) ((1B) a Preparing Step of Composite Particles (B))]

Although a manufacturing method of composite particles (B) is not particularly limited, as is the same with step (1A), a manufacturing method using a wet granulation method or a spray drying granulation method is preferable.

Manufacturing method of composite particles (B) of a wet granulation method comprises; a slurry preparation step wherein a binding agent, an alkaline metal powder or an alkaline earth metal powder each having a coated surface, and when required, conductive agent and the other additives, are mixed in a non-aqueous solvent; a fluid granulation step wherein an electrode active material is fluidized and the above slurry is sprayed thereon; and a rolling granulation step of the obtained particles by the fluid granulation step.

First, a binding agent, an alkaline metal powder or an alkaline earth metal powder each having a coated surface, and when required, a conductive agent and the other additive are mixed in a non-aqueous solvent; and a slurry is obtained. The non-aqueous solvent exemplifies carbon hydride such as n-hexane, n-heptane, cyclohexane; aromatic hydrocarbon such as toluene, xylene; alkyl alcohol such as methyl alcohol, ethyl alcohol, propyl alcohol; alkyl ketone such as acetone, methyl ethyl ketone; ether such as tetrahydrofuran, dioxane, diglyme, cyclopentylmethyl ether; amide such as diethylformamide, dimethylacetamide, N-methyl-2-pyrolidone (hereinafter referred to as "NMP"), dimethylimidazolidinone; sulfur solvent such as dimethylsulfoxide, sulfolane. Among all, carbon hydride and ether are preferable. Drying rate during a fluid granulation can be accelerated when non-aqueous solvent with a lower boiling point than that of water is used. In addition, when a non-aqueous solvent with a lower boiling point than that of water is used, production efficiency can be increased since solubility of a binding agent changes, and viscosity and fluidity of slurry can be adjusted considering an amount and a kind of solvent.

A non-aqueous solvent amount used for preparing slurry is an amount wherein solid content concentration is within a range of generally 1 to 50 wt %, preferable 5 to 50 wt %, and the most preferably 10 to 30 wt %. It is preferable for a uniform disperse of a binding agent and an alkaline metal powder or an alkaline earth metal powder each having a coated surface, when said non-aqueous solvent amount is within this range.

A method or a procedure to disperse or dissolve a binding agent, an alkaline metal powder or an alkaline earth metal powder each having a coated surface, and when required, a conductive agent or the other additive to non-aqueous solvent is not particularly limited; and it exemplifies a method wherein a binding agent, an alkaline metal powder or an alkaline earth metal powder each having a coated surface, conductive agent and the other additive are added to non-aqueous solvent and mixed thereof; a method wherein a binding agent dissolved in a non-aqueous solvent is added to a non-aqueous solvent, subsequently a conductive agent is added and mixed, and lastly, an alkaline metal powder or an alkaline earth metal powder each having a coated surface and the other additives are added and mixed, a method wherein an alkaline metal powder or an alkaline earth metal powder each having a coated surface and conductive agent are added to a non-aqueous solvent and mixed, and then a binding agent dissolved to a non-aqueous solvent is added thereof and mixed, and so on. Mixing measure exemplifies a mixture device such as ball mill, sand mill, beads mill, pigment disperser, stone mill, ultrasonic disperser, homogenizer, planetary mixer and so on. The mixture is generally performed at within a range of a room temperature to 80° C. for 10 minutes to several hours.

Note, a fluid granulation step wherein an electrode active material is fluidized and the above-mentioned slurry is sprayed thereon, and then it is fluid granulated, a step wherein particles obtained in the above fluid granulation step is roll granulated, and a heat treated step are the same with the first manufacturing method of composite particles (A).

The second manufacturing method of composite particles (B) is a manufacturing method using a spray drying granulation method, and comprises; a slurry preparing step wherein an electrode active material, a binding agent, an alkaline metal powder or an alkaline earth metal powder each having a coated surface, and when required, a conductive agent and the other additive are mixed in a non-aqueous solvent, and a step wherein the above slurry is spray dry granulated.

First, an electrode active material, a binding agent, an alkaline metal powder or an alkaline earth metal powder each having a coated surface, and when required, conductive agent and the other additive are dispersed or dissolved in a non-aqueous solvent; and a slurry in which an electrode active material, a binding agent, an alkaline metal powder or an alkaline earth metal powder each having a coated surface, and when required, conductive agent and the other additive are dispersed or dissolved is obtained. The non-aqueous solvent used to obtain slurry is the same with that used in the above-mentioned first manufacturing method. Non-aqueous solvent amount used for preparing slurry is an amount wherein solid content concentration of the slurry is within a range of generally 1 to 50 wt %, preferably 5 to 50 wt %, and the most preferably 10 to 30 wt %.

A method or a procedure to disperse or dissolve an electrode active material, a binding agent, an alkaline metal powder or an alkaline earth metal powder each having a coated surface, and when required, a conductive agent and the other additive in a non-aqueous solvent is not particularly limited; and it exemplifies a method wherein an electrode active material, a binding agent, an alkaline metal powder or an alkaline earth metal powder each having a coated surface, and when required, a conductive agent and the other additive are added to a non-aqueous solvent and mixed thereof a method wherein a binding agent dissolved to a non-aqueous solvent is added to a non-aqueous solvent, subsequently a conductive agent is added and mixed, and lastly, an electrode active material and an alkaline metal powder or an alkaline earth metal powder each having a coated surface are added and mixed; an electrode active material, an alkaline metal powder or an alkaline earth metal powder each having a coated surface and conductive agent are added to a non-aqueous solvent and mixed, subsequently a binding agent dissolved non-aqueous solvent is added and mixed; and so on. Mixing measure exemplifies a mixture device such as ball mill, sand mill, beads mill, pigment disperser, stone mill, ultrasonic disperser, homogenizer, planetary mixer and so on. The mixture is generally performed at within a range of a room temperature to 80° C. for 10 minutes to several hours.

Note, a spray drying granulation step of the above slurry is the same with that of the second manufacturing method of composite particles (A).

With the manufacturing method above, composite particles (B) including an electrode active material, a binding agent, an alkaline metal powder or an alkaline earth metal powder each having a coated surface, and when required, a conductive agent and the other additive can be obtained.

Composite particles (B) are mixed with the other binding agent or the other additive, added when required; and the mixture is used for an electrode for an electrochemical element material (hereinafter, may be merely referred to as "electrode material") for forming an electrode composition layer.

Amount of composite particles (B) included in electrode material is generally 50 wt % or more, preferably 70 wt % or more, and the most preferably 90 wt % or more.

Said composite particles (B) already include a binding agent, and thus, it is not required to separately add the other binding agent when preparing electrode material; however, the other binding agents may be added when preparing electrode material in order to increase a binding force between composite particles (B). Amount of the other binding agent added when preparing electrode material, with a total of binding agent in composite particles (B), is generally 0.1 to 50 parts by weight, preferably 0.5 to 20 parts by weight, and more preferably 1 to 10 parts by weight, with respect to 100 parts by weight of an electrode active material. The other additives include shape forming aids such as water, alcohol, and so on; and they can be suitably selected and added in an amount which do not undermine the efficiency of the present invention.

Moisture amount of thus obtained composite particles (B) is preferably 400 ppm or less and more preferably 100 ppm or less. By determining moisture amount of composite particles (B) within the above range, charge-discharge cycle characteristic of an electrochemical element can be improved.

[(2B) A Foaming Step of Electrode Composition Layer by Compression Forming Composite Particles (B)]

According to manufacturing method of an electrode for an electrochemical element of the present invention, an electrode composition layer is obtained by compression forming the above-mentioned composite particles (B). Step (2B) is the same with step (3A), except using composite particles (B) instead of the mixed powder used in step (3A).

[(3B) an Integration Step of an Electrode Composition Layer and a Current Collector]

Step (3B) is the same with step (4A).

Although thickness of an electrode composition layer of an electrode for an electrochemical element obtained by manufacturing methods according to the present invention varies due to a kind of an electrochemical element, it is generally 10 to 500 μm, preferably 20 to 400 μm, and the most preferably 30 to 200 μm. When thickness of an electrode composition layer is within this range, it is preferable for an electrode for an electrochemical element due to a balance between an internal resistance and an energy density.

An electrochemical element according to the present invention is equipped with an electrode for an electrochemical element obtained by the present invention. An electrochemical element exemplifies a lithium-ion secondary battery, an electric double layer capacitor, a lithium ion capacitor, a sodium battery and a magnesium battery; and a lithium-ion secondary battery and a lithium ion capacitor are preferable and a lithium-ion secondary battery are more preferable. Hereinafter, a case in which an electrode for an electrochemical element obtained according to the manufacturing method of the present invention is used for an electrode of a lithium-ion secondary battery is described.

A lithium-ion secondary battery is a secondary battery equipped with a positive electrode, a negative electrode, a separator and an electrolyte; and the positive electrode and/or the negative electrode is a lithium-ion secondary battery electrode manufactured by the methods above.

(Separator)

A separator is a porous substrate having pores, and examples of the separator that can be used include (a) a porous separator having pores, (b) a porous separator which a polymer coat layer is formed on one or both surfaces, or (c) a porous separator which a porous resin coat layer containing inorganic ceramic powder is formed on the surface. The non-limiting examples of these separators include: a polypropylene, polyethylene, polyolefin or aramid porous separator; a separator coated with a polymer film or a gelling polymer coating layer for a solid polyelectrolyte or a gelatinous polyelectrolyte such as polyvinylidene fluoride, polyethylene oxide, polyacrylonitrile and a polyvinylidene fluoride hexafluoropropylene copolymer; and a separator coated with a porous film layer composed of a dispersant for an inorganic filler or an inorganic filler.

(Electrolyte)

The electrolyte used in the present invention is not particularly limited, but for example, those in which a lithium salt dissolved as a supporting electrolyte in a nonaqueous solvent can be used. Examples of the lithium salt include a lithium salt such as $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$ and $(C_2F_5SO_2)NLi$ or so. Especially preferably used are $LiPF_6$, $LiClO_4$ and $CF_3SO_3Li$, which can easily dissolve a solvent and exhibit a high dissociation degree. These can be used alone or by combining two or more thereof. The amount of the supporting electrolyte is generally 1 wt % or more, preferably 5 wt % or more, and generally 30 wt % or less and preferably 20 wt % or less, with respect to the electrolyte. When the amount of the supporting electrolyte is too small or too large, the ion conductivity declines and the charge and discharge characteristics of the battery decline.

A solvent used in the electrolyte is not particularly limited as long as it dissolves the supporting electrolyte, however alkyl carbonates such as dimethyl carbonate (DMC), ethylene carbonate (EC), diethyl carbonate (DEC), propylene carbonate (PC), butylene carbonate (BC), methyl ethyl carbonate (MEC), ethyl methyl carbonate (EMC); esters such as γ-butyrolactone and methyl formate; ethers such as 1,2-dimethoxyethane and tetrahydrofuran; and sulfur-containing compounds such as sulfolane and dimethylsulfoxide may be mentioned. Dimethyl carbonate, ethylene carbonate, propylene carbonate, diethyl carbonate and methyl ethyl carbonate are preferable because especially high ionic conductivity is easily obtained and the operating temperature range is wide. These can be used alone or by combining two or more thereof. In addition, an additive can also be used by adding into the electrolyte. As the additive, a carbonate compound such as vinylene carbonate (VC) or so is preferable.

Examples of the electrolyte other than the above include a gelatinous polymer electrolyte in which an electrolyte is immersed with a polymer electrolyte such as polyethylene oxide and polyacrylonitrile, and an inorganic solid electrolyte such as lithium sulfide, LiI and $Li_3N$ or so.

(Manufacturing Method of a Lithium-Ion Secondary Battery)

Manufacturing method of a lithium-ion secondary battery is not particularly limited. For example, the above negative and positive electrodes are stacked against each other via a separator and wound or folded according to the battery shape to place into a battery container and the battery container is sealed after an electrolyte is poured into the battery container. Further, an expanded metal, an overcurrent preventing element such as a fuse or a PTC element and a lead plate may be placed depending on the needs thereby, and the pressure increase inside the battery and overcharge and overdischarge can be prevented. The shape of the battery may be a stacking cell type, a coin type, a button type, a sheet type, a cylindrical type, a square type, a flat type and the like.

EXAMPLES

Hereinafter, the present invention will be described in detail by referring to the examples and comparative examples; however the present invention is not limited to the examples. Further, the "parts" and "%" in the present examples and comparative examples are based on the weight basis unless otherwise specified. In examples and comparative examples, various physical properties were evaluated as follows.

(Measurement Method of Moisture Amount)

Moisture amount of composite particles was measured with Karl Fischer moisture meter "CA-06" (by Mitsubishi Kasei Corporation, which is now Mitsubishi Chemical Corporation) of a coulometric titration method and a vaporizer "VA-06" (by Mitsubishi Kasei Corp.). Aquamicron AX (by Mitsubishi Chemical Corp.) was used for anode electrolyte and Aquamicron CXU (by Mitsubishi Chemical Corp.) for cathode electrolyte. 1 g of composite particles was weighed on a sample boat and heated to 150° C. using a vaporizer. Vapors generated in this occasion were ventilated to anode electrolyte of moisture meter, and moisture amount was measured. The obtained moisture amount (µg) was divided with sample weight (g), and was determined a moisture amount (ppm) of composite particles.

(Measurement of a Coat Layer Thickness)

Cross-sectional observation of an alkaline metal powder or an alkaline earth metal powder each having a coated surface was performed with transmission electron microscope "JEM-2100F" (by Japan Electron Optics Laboratory Co. Ltd.), and then a coat layer thickness was measured. Note the average value of 50 samples was determined as the coat layer thickness.

(The Peeling Strength)

The negative electrodes were cut into rectangular shapes with a width of 1 cm and a length of 10 cm, which are used as test pieces, and fixed thereof so that an electrode composition layer surface face upward. After a scotch tape is stuck to the surface of the electrode composition layer of the test piece, the stress is measured when the scotch tape is peeled off from one end of the test piece in the 180 degree direction at a rate of 50 mm/min. The measurement was performed for 10 times and the average value of 10 measurements was determined and defined as peeling strength. Evaluation was carried out based on the following standards. The larger this value is, the superior the adhesive strength of the electrode is.
A: 8 N/m or more
B: 6 N/m or more to less than 8 N/m
C: 4 N/m or more to less than 6 N/m
D: 2 N/m or more to less than 4 N/m
E: 2 N/m or more to less than 3 N/m
F: Less than 2 N/m (Predoping Time)

Immediately after manufacturing the cell for measurement was determined a predoping starting time. The obtained electrochemical element (cell for measurement) was stored in a thermostated bath of 25° C.; and AC (alternating-current) resistance and negative electrode potential were measured hourly using AC Milliohm Hitester (by Hioki E.E. Corp.). Predoping ending was certified when changed amount of AC resistance and negative electrode potential were within 0.5%. Time from a predoping starting to a predoping ending (predoping time) was measured and evaluation was carried out based on the following standards. The shorter this predoping time is, the higher the productivity of the battery is
A: Less than 2 hours
B: 2 hours or more to less than 5 hours C: 5 hours or more to less than 10 hours
D: 10 hours or more to less than 15 hours
E: 15 hours or more
(Internal Resistance)

The obtained electrochemical elements (cell for measurement) were each charged with constant current and constant voltage until a rated voltage by a constant-current constant-voltage charging method at 25° C. and charging rate of 0.2 C. Subsequently, discharge rate was made 0.2 C and discharged to a lower limit voltage. On this occasion, voltage drop after 10 seconds from discharge starting was determined ΔV. Voltage drop ΔV was measured by varying the discharge rate from 0.2 to 10 C, current value I (A) and voltage drop ΔV were plotted, slopes of the obtained line was determined internal resistance, and evaluation was carried out based on the following standards. The smaller the internal resistance is, the superior the electrochemical element is.

A: Less than 0.40Ω
B: 0.40Ω or more to less than 0.45Ω
C: 0.45Ω or more to less than 0.50Ω
D: 0.50Ω or more to less than 0.55Ω
E: 0.55Ω or more
(Initial Discharge Capacity)

The obtained electrochemical elements (cell for measurement) were each charged with constant current and constant voltage until a rated voltage, by a constant-current constant-voltage charging method at 25° C. and charging rate of 0.2 C. It was discharged to a lower limit voltage, after the charging. This discharge and charge cycle was performed for 3 times repeatedly, and capacity of the 3rd discharge was determined an initial discharge capacity.
(Charge-Discharge Cycle Characteristics)

The obtained electrochemical elements (cell for measurement) were each charged with a constant current until 4.2 V, by a 0.5 C constant-current constant-voltage charging method at 25° C., and then charged with a constant voltage (4.2 V), and further a charge and discharge cycle was carried out in which discharging with a 0.5 C constant current until 3.0 V. The charge and discharge cycle was carried out for 100 cycles and the ratio of the discharge capacity at 100th cycle against the initial discharge capacity is defined as a capacity maintenance rate. Evaluation is made based on the following criteria. The larger the value is, the smaller the capacity reduction due to the repeated charge and discharge is.

A: 90% or more
B: 80% or more to less than 90%
C: 70% or more to less than 80%
D: 60% or more to less than 70%
E: Less than 60%

Example 1

<Manufacturing Alkaline Metal Powder Having a Coated Surface>

55.72 g of lithium dispersion in oil (lithium content ratio=11.275%) including 6.28 g of lithium was poured in a hastelloy can. The lithium dispersion in oil was heated to 75° C., 1.9 g of 10% p-xylene (Aldrich) liquid solution of styrene.butadiene copolymer liquid solution (styrene:butadiene=85:15 (mass ratio)) was added as coat polymer, stirred for 22 hours at 200 rpm, and then a lithium dispersed material was obtained. Then, the lithium dispersed material was cooled to a room temperature. In addition, lithium dispersed material was filtrated in order to remove hydrocarbon oil solvent; and then the obtained filtrate was washed with hexane for 3 times and with n-pentane for 2 times. The obtained washed filtrate was dried in a dried argon. Thus, lithium metal powder having a coated surface with a mean volume particle diameter of 30 μm was obtained. Note a coated film thickness was 20 nm, and an additive amount of coat polymer with respect to 100 parts of lithium metal powder was 3 parts. Further, Tg of coat polymer was 54° C.

<Manufacturing Composite Particles (A)>

100 parts of Si—O—C (1200 mAh/g of an initial charging capacity and 360 mAh/g of irreversible capacity) as negative electrode active material, 2 parts, as a solid content, of 40% moisture dispersion of styrene.butadiene copolymer (styrene:butadiene=60:40 (mass ratio), Tg=−1° C.) as a water dispersible binding agent, 5 parts of acetylene black (Denka Black powder by Denki Kagaku Kogyo Kabushiki Kaisha) having an average particle diameter of 0.7 μm as conductive agent, 1.4 parts, as a solid content, of 1.5% water solution of carboxymethyl cellulose sodium salt ("BSH-6" by Dai-ichi Kogyo Seiyaku Co., Ltd.) as a dissolve type resin, and 338.7 parts of ion-exchange water were added; and then stirred and mixed thereof by "TK homomixer" by PRIMIX Corp. preparing a slurry of 20% solid content concentration. The slurry showed pH of 7.6 at 23° C. This slurry was prepared to show pH of 8.5 with 25% ammonia water; and spray drying granulation was performed by using a spray dryer (OC-16 by Ohkawara Kakohki Co., Ltd.) and an atomizer (a diameter of 65 mm) of a rotating disk method with a rotation number of 25,000 rpm, a heated air temperature of 150° C. and a particle collecting outlet temperature of 90° C. And then, composite particles (A) were obtained. A weight average particle diameter of composite particles (A) was 54 μm. Further, composite particles (A) were vacuum-dried for 24 hours at 150° C., and a moisture amount of said composite particles (A) was confirmed to be 50 ppm or less.

<Manufacturing a Mixed Powder>

Under an atmosphere of −50° C. or less dew point, 10 parts of lithium metal powder having a coated surface with respect to 100 parts of negative electrode active material were dry mixed for 10 minutes, with a rotation number of 500 rpm using Henschel Mixer by Mitsui Miike Machinery Co., Ltd.; and then a mixed powder was obtained.

<Manufacturing a Slurry for Forming Conductive Adhesive Layer>

100 parts of carbon black having a mean volume particle diameter of 0.7 μm, 4 parts, as a solid content, of 4.0% water solution (DN-10L by Daicel Chemical Investment Co., Ltd., now Daicel Corp.) of carboxymethyl cellulose ammonium salt as dispersing agent, 8 parts, as a solid content, of 40% moisture dispersion of acrylate polymer (2-ethylhexyl acrylate acrylonitrile=75:25 (mass ratio)) having number average particle diameter of 0.25 μm as resin components (a binding agent), and ion-exchange water were mixed so as to make a total solid content concentration of 30%; and a slurry for forming conductive adhesive layer was adjusted.

<Formation of Conductive Adhesive Layer>

A slurry for forming conductive adhesive layer is coated on both surfaces of current collector (hereinafter, may be mentioned as "copper current collector") comprising a copper foil having 20 μm thickness, dried thereof for 10 minutes at 120° C.; and then a conductive adhesive layer of 4 μm thickness was obtained.

<Formation of an Electrode Composition Layer for Negative Electrode>

The above mixed powder was supplied to a pressing roll (a roll temperature of 120° C. and a pressing linear pressure of 400 kN/m) of a roll press machine (a press-cutting rough surface heat roll by Hirano Giken Kogyo Co., Ltd.) at a supply rate of 70 g/min by using a quantitative feeder (Nikka Sprayer K-V by Nikka). Subsequently, a PET film (a thickness of 75

µm and a tension strength of 200 MPa), roughened by kneading a mat material making surface roughness Ra of 0.14 µm, was inserted between pressing rolls as a substrate; a mixed powder supplied from quantitative feeder was adhered on the substrate; compression formed thereof at a shape forming rate of 15/min; and then an electrode composition layer for negative electrode having an average thickness of 60 µm and an average single density of 1.2 g/cm$^3$ formed substrate with an electrode composition layer was formed.

<Manufacturing a Negative Electrode>

Next, a winding storage of substrate with an electrode composition layer was set to unwinder 12 of a device shown in FIG. 1, and detaching only the substrate, subsequently bonded to both surfaces of copper current collector wherein the above conductive adhesive layer is formed by the use of laminating machine 16.

<Manufacturing a Positive Electrode>

100 parts of LiMn$_2$O$_4$ having a spinel structure as a positive electrode active material, 2 parts, as a solid content, of 28% moisture dispersion of acrylate polymer (butyl acrylate; methyl methacrylate:itaconic acid=80:15:5 (mass ratio), Tg=−28° C., 0.3 µm of number average particle diameter) as a water dispersible binding agent, 5 parts of acetylene black (Denka Black powder by Denki Kagaku Kogyo Kabushiki Kaisha) having an average particle diameter of 0.7 µm as a conductive agent, 1.4 parts, as a solid content, of 1.5% water solution of carboxymethyl cellulose sodium salt ("BSH-6" by Dai-ichi Kogyo Seiyaku Co., Ltd.) as a dissolve type resin, and 65.5 parts of ion-exchange water were added; and then stirred and mixed thereof by "TK homomixer" by PRIMIX Corp. preparing a slurry of 40% solid content concentration. The slurry showed pH of 10.6 at 23° C. This slurry was adjusted to show pH of 8.5 with 25% ammonia water; and spray drying granulation was performed by using a spray dryer (OC-16 by Ohkawara Kakohki Co., Ltd.) and an atomizer (a diameter of 65 mm) of a rotating disk method with a rotation number of 25,000 rpm, a heated air temperature of 150° C. and a particle collecting outlet temperature of 90° C. And then, composite particles for positive electrode were obtained. A weight average particle diameter of this composite particles was 43 µm.

The above-mentioned slurry for forming conductive adhesive layer was coated on both surfaces of a current collector of an aluminum foil having a thickness of 20 µm (hereinafter, may be mentioned as "an aluminum current collector"), dried thereof for 10 minutes at 120° C., and then a conductive adhesive layer having a thickness of 4 µm was obtained.

The above composite particles for positive electrode was supplied to a pressing roll (a roll temperature of 120° C. and a pressing linear pressure of 400 kN/m) of a roll press machine (a press-cutting rough surface heat roll by Hirano Giken Kogyo Co., Ltd.) at a supply rate of 70 g/min by using a quantitative feeder (Nikka Sprayer K-V by Nikka). Subsequently, a PET film (a thickness of 75 µm and a tension strength of 200 MPa), roughened by kneading a mat material making surface roughness Ra of 0.14 µm, was inserted between pressing rolls as a substrate; the composite particles for positive electrode supplied from quantitative feeder was adhered on the substrate; compression formed thereof at a shape forming rate of 15/min; and then an electrode composition layer for negative electrode having an average thickness of 200 µm and an average single density of 2.5 g/cm$^3$ formed substrate with an electrode composition layer was formed.

Next, a winding storage of substrate with an electrode composition layer was set to unwinder 12 of a device shown in FIG. 1, and detaching only the substrate, subsequently bonded to both surfaces of aluminum current collector wherein the above conductive adhesion is formed by the use of laminating machine 16.

<Manufacturing Cell for Measurement>

The above manufactured double-sided electrode (positive and negative electrodes) was cut, leaving an electrode composition layer unformed part of 2 cm long×2 cm wide and making positive electrode of an electrode composition layer formed part to 5 cm long×5 cm wide, while negative electrode of an electrode composition layer formed part to 5.2 cm long×5.2 cm wide (an electrode composition layer unformed part was formed as to extend a side of a square of an electrode composition layer formed part). Thus cut 4 positive electrodes and 5 negative electrodes were prepared, and each of their electrode composition layer unformed parts was ultrasonic welded. In addition, 7 cm long×1 cm wide×0.01 cm thickness tab materials, comprising aluminum for positive electrode and nickel for negative electrode, were ultrasonic welded to an electrode composition layer unformed parts wherein each are laminated and welded; thus, a measuring electrode was manufactured. The measuring electrode was vacuum-dried for 24 hours at 200° C. A polypropylene separator ("Celgard 2400" by Celgard LLC) having a thickness of 20 µm was cut to 5.3 cm long×5.3 cm wide. A terminal welded part of positive electrode current collector and that of negative electrode current collector were placed to the same direction not to overlap each other; and all are laminated so as to make positive electrode and negative electrode to alternate, and all the electrodes at the outermost part of the laminated electrode to show negative electrode. On this occasion, the separator was placed between positive electrode and negative electrode, the separator was further placed at uppermost part and lowermost part, and 4 sides were taped to manufacture an electrode multilayered body.

A stainless mesh having a thickness of 100 µm, cut to have a lithium pasted part of 5 cm long×5 cm wide and a tab formation part of 2 cm long×2 cm wide, and a lithium metal foil (82 µm thickness, 5 cm long×5 cm wide) were pressure bonded. Further, a tab material of 7 cm long×1 cm wide×0.01 cm thickness comprising nickel was ultrasonic welded to tab formation part, and a lithium reference electrode was manufactured. The lithium reference electrode was placed to face a negative electrode, which is at the outermost part of the above electrode multilayered body; and tab material of the lithium reference electrode was placed to project at the other side of tab material of positive and negative electrodes.

The above lithium reference electrode placed electrode multilayered body was placed in a deep drawing exterior film, three sides were fused, vacuum-impregnated by using a liquid solution (by Kishida Chemical Co., Ltd.) wherein LiPF$_6$ was dissolved to a mixed solvent of ethylenecarbonate and ethyl methylcarbonate having a weight ratio of 3:7, showing a concentration of 1 mole/a liter as electrolyte, the remaining one side was fused under reduced pressure, and cell for measurement (laminated lithium-ion secondary battery) was manufactured. Note that difference between SP value of a coat polymer and that of a solvent used for electrolyte was 0.68.

The determination results of the cell for measurement are shown in Table 1.

Example 2

Composite particles (A) was obtained as is the same with Example 1, except a hard carbon ("Carbotron P" by Kureha Corp.) instead of Si—O—C was used as a negative electrode active material. Weight average particle diameter of composite particles (A) was 45 μm, and moisture amount of the same was 50 ppm or less.

As is the same with example 1, negative electrode was obtained and cell for measurement was manufactured; except 2 parts of lithium metal powder having a coated surface with respect to 100 parts of electrode active material in composite particles (A) were dry mixed for 10 minutes, with a rotation number of 500 rpm using Henschel Mixer by Mitsui Miike Machinery Co., Ltd.; and then a mixed powder was obtained. The determination results of the cell for measurement are shown in Table 1. Note that difference between SP value of a coat polymer and that of a solvent used for electrolyte was 0.68.

Example 3

Composite particles (A) was obtained as is the same with Example 1, except using 28% moisture dispersion of acrylate polymer (butyl acrylate:methyl methacrylate:itaconic acid=80:15:5 (mass ratio), Tg=−28° C., number average particle diameter of 0.3 μm) instead of 40% moisture dispersion of styrene.butadiene copolymer as a water dispersible binding agent. Weight average particle diameter of composite particles (A) was 53 μm, and moisture amount of the same was 50 ppm or less.

Negative electrode was obtained as is the same with example 1, except using said composite particles (A); and cell for measurement was manufactured. The determination results of the cell for measurement are shown in Table 1. Note that difference between SP value of a coat polymer and that of a solvent used for electrolyte was 0.68.

Example 4

Lithium metal powder having a coated surface was obtained as is the same with example 1, except a stirred condition when preparing lithium dispersed material was 250 rpm and additive amount of 10% p-xylene liquid solution of the above styrene.butadiene copolymer used as a coat polymer was 5.7 g. Note that, a mean volume particle diameter of lithium metal powder having a coated surface was 10 μm, a coated film thickness thereof was 20 nm, and an additive amount of coat polymer with respect to 100 parts of lithium metal powder was 9 parts.

Negative electrode was obtained as is the same with example 1, except using said lithium metal powder having a coated surface; and cell for measurement was manufactured. The determination results of the cell for measurement are shown in Table 1. Note that difference between SP value of a coat polymer and that of a solvent used for electrolyte was 0.68.

Example 5

Lithium metal powder having a coated surface was obtained as is the same with example 1, except a stirred condition when preparing lithium dispersed material was 100 rpm and additive amount of 10% p-xylene liquid solution of the above styrene.butadiene copolymer used as a coat polymer was 0.75 g. Note that, a mean volume particle diameter of lithium metal powder having a coated surface was 80 μm, a coated film thickness thereof was 20 nm, and an additive amount of coat polymer with respect to 100 parts of lithium metal powder was 1.2 parts.

Negative electrode was obtained as is the same with example 1, except using said lithium metal powder having a coated surface; and cell for measurement was manufactured. The determination results of the cell for measurement are shown in Table 1. Note that difference between SP value of a coat polymer and that of a solvent used for electrolyte was 0.68.

Example 6

Lithium metal powder having a coated surface was obtained as is the same with example 1, except 4.7 g of 10% p-xylene (Aldrich) liquid solution of ("Polybead Polystyrene Microspheres <1.00 μm, Dry Form" by Techno Chemical Corp.) of polystyrene instead of styrene.butadiene copolymer was used as coat polymer. Note that, a mean volume particle diameter of lithium metal powder having a coated surface was 30 μm, a coated film thickness thereof was 50 nm, and an additive amount of coat polymer with respect to 100 parts of lithium metal powder was 7.5 parts. In addition, Tg of the coat polymer was 100° C.

Negative electrode was obtained as is the same with example 1, except using said lithium metal powder having a coated surface; and cell for measurement was manufactured. The determination results of the cell for measurement are shown in Table 1. Note that difference between SP value of a coat polymer and that of a solvent used for electrolyte was 1.22.

Example 7

Lithium metal powder having a coated surface was obtained as is the same with example 1, except 1.9 g of 10% p-xylene (Aldrich) liquid solution of polyacrylonitrile (by Sigma-Aldrich) was used as coat polymer. Note that, a mean volume particle diameter of lithium metal powder having a coated surface was 30 μm, a coated film thickness thereof was 20 nm, and an additive amount of coat polymer with respect to 100 parts of lithium metal powder was 3 parts. In addition, Tg of the coat polymer was 97° C.

Negative electrode was obtained as is the same with example 1, except using said lithium metal powder having a coated surface. Cell for measurement was manufactured as is the same with example 1, except a liquid solution wherein $LiPF_6$ was dissolved to polycarbonate with a concentration of 1 mole/a liter was used as electrolyte. The determination results of the cell for measurement are shown in Table 1. Note that difference between SP value of a coat polymer and that of a solvent used for electrolyte was 0.82.

Example 8

Lithium metal powder having a coated surface was obtained as is the same with example 1, except 1.9 g of 10% p-xylene (Aldrich) liquid solution of styrene.methyl methacrylatecopolymer ("E-103" by Nippon Paint Co., Ltd.) was used as coat polymer, instead of styrene.butadiene copolymer. Note that, a mean volume particle diameter of lithium metal powder having a coated surface was 30 μm, a coated film thickness thereof was 30 nm, and an additive amount of coat polymer with respect to 100 parts of lithium metal powder was 3 parts. In addition, Tg of the coat polymer was 120° C.

Negative electrode was obtained as is the same with example 1, except using said lithium metal powder having a coated surface; and cell for measurement was manufactured. The determination results of the cell for measurement are shown in Table 1. Note that difference between SP value of a coat polymer and that of a solvent used for electrolyte was 0.55.

Example 9

Lithium metal powder having a coated surface was obtained as is the same with example 1, except 9.4 g of 10% p-xylene (Aldrich) liquid solution of polymethylmethacrylate "81504, Fluka" (by Sigma-Aldrich) was used as coat polymer, instead of styrene.butadiene copolymer. Note that, a mean volume particle diameter of lithium metal powder having a coated surface was 30 μm, a coated film thickness thereof was 100 nm, and an additive amount of coat polymer with respect to 100 parts of lithium metal powder was 15 parts. In addition, Tg of the coat polymer was 105° C.

Negative electrode was obtained as is the same with example 1, except using said lithium metal powder having a coated surface; and cell for measurement was manufactured. The determination results of the cell for measurement are shown in Table 1. Note that difference between SP value of a coat polymer and that of a solvent used for electrolyte was 1.66.

Example 10

Lithium metal powder having a coated surface was obtained as is the same with example 1, except $CO_2$ was used to coat lithium metal powder, instead of styrene.butadiene copolymer. Note that, a mean volume particle diameter of lithium metal powder having a coated surface was 30 μm, a coated film thickness thereof was 5 nm, and an additive amount of $CO_2$ with respect to 100 parts of lithium metal powder was 1 part.

Negative electrode was obtained as is the same with example 1, except using said lithium metal powder having a coated surface; and cell for measurement was manufactured. The determination results of the cell for measurement are shown in Table 1.

Example 11

Lithium metal powder having a coated surface was obtained as is the same with example 1, except wax ("Luwax A" by BASF) was used to coat lithium metal powder, instead of styrene.butadiene copolymer. Note that, a mean volume particle diameter of lithium metal powder having a coated surface was 30 μm, a coated film thickness thereof was 5 nm, and an additive amount of wax with respect to 100 parts of lithium metal powder was 0.5 parts.

Negative electrode was obtained as is the same with example 1, except using said lithium metal powder having a coated surface; and cell for measurement was manufactured. The determination results of the cell for measurement are shown in Table 1.

Example 12

A mixed powder and negative electrode was obtained and cell for measurement was obtained as is the same with example 1, except a vacuum-drying condition when manufacturing composite particles (A) was 100° C. for 10 hours. The determination results of the cell for measurement are shown in Table 1. Note that a moisture amount of composite particles (A) was 200 ppm. Note that difference between SP value of a coat polymer and that of a solvent used for electrolyte was 0.68.

Example 13

Negative electrode was obtained and cell for measurement was manufactured as is the same with example 1, except mixed powder was obtained under an atmosphere of −30° C. dew point. The determination results of the cell for measurement are shown in Table 1. Note that difference between SP value of a coat polymer and that of a solvent used for electrolyte was 0.68.

Example 14

Negative electrode was obtained and cell for measurement was manufactured as is the same with example 1, except mixed powder was obtained by dry mixing for 5 minutes, with a rotation number of 500 rpm using Henschel Mixer (by Mitsui Miike Machinery Co., Ltd.) under an atmosphere of −10° C. dew point. The determination results of the cell for measurement are shown in Table 1. Note that difference between SP value of a coat polymer and that of a solvent used for electrolyte was 0.68.

Example 15

Negative electrode was obtained and cell for measurement was manufactured as is the same with example 1, except mixed powder was obtained by dry mixing for 1 minute, with a rotation number of 500 rpm using Henschel Mixer (by Mitsui Miike Machinery Co., Ltd.) under an atmosphere of −10° C. dew point. The determination results of the cell for measurement are shown in Table 1. Note that difference between SP value of a coat polymer and that of a solvent used for electrolyte was 0.68.

Example 16

A cell for measurement was manufactured as is the same with example 1, except using copper current collector, wherein conductive adhesive layer is coated on both surfaces, instead of a substrate used when forming composition layer for negative electrode; and directly forming an electrode composition layer on both surfaces of conductive adhesive layer of copper current collector, preparing negative electrode. The determination results of the cell for measurement are shown in Table 1. Note that difference between SP value of a coat polymer and that of a solvent used for electrolyte was 0.68.

Example 17

Negative electrode was obtained and cell for measurement was manufactured as is the same with example 16, except using a conductive adhesive layer uncoated copper current collector, instead of a conductive adhesive layer coated copper current collector. The determination results of the cell for measurement are shown in Table 1. Note that difference between SP value of a coat polymer and that of a solvent used for electrolyte was 0.68.

Example 18

A stirred condition for preparing lithium dispersed material was 600 rpm, and a lithium metal powder having a coated surface with a mean volume particle diameter of 1 μm was obtained. Note that a coated film thickness was 20 nm; and an additive amount of a coat polymer with respect to 100 parts of lithium metal powder was 3 parts. In addition, Tg of the coat polymer was 54° C.

Mixed powder and negative electrode were obtained and a cell for measurement was manufactured as is the same with example 1, except the above lithium metal powder having a coated surface was used. The determination results of the cell for measurement are shown in Table 1. Note that difference between SP value of a coat polymer and that of a solvent used for electrolyte was 0.68.

Example 19

A stirred condition for preparing lithium dispersed material was 300 rpm, and a lithium metal powder having a coated surface with a mean volume particle diameter of 5 μm was obtained. Note that a coated film thickness was 20 nm; and an additive amount of a coat polymer with respect to 100 parts of lithium metal powder was 3 parts. In addition, Tg of the coat polymer was 54° C.

Mixed powder and negative electrode were obtained and cell for measurement was manufactured as is the same with example 1, except the above lithium metal powder having a coated surface was used. The determination results of the cell for measurement are shown in Table 1. Note that difference between SP value of a coat polymer and that of a solvent used for electrolyte was 0.68.

Example 20

Lithium metal powder having a coated surface was obtained as is the same with example 1, except 1.9 g of 10% p-xylene (Aldrich) liquid solution of styrene.methyl methacrylatecopolymer ("E-103" by Nippon Paint Co., Ltd.) was used as coat polymer, instead of styrene.butadiene copolymer. Note that, a mean volume particle diameter of lithium metal powder having a coated surface was 30 μm, a coated film thickness thereof was 30 nm, and an additive amount of coat polymer with respect to 100 parts of lithium metal powder was 3 parts. In addition, Tg of the coat polymer was 120° C.

Negative electrode was obtained as is the same with example 1, except using said lithium metal powder having a coated surface. Cell for measurement was manufactured as is the same with example 1, except a liquid solution (by Kishida Chemical Co., Ltd.) wherein $LiPF_6$ was dissolved to a mixed solvent of ethylenecarbonate and ethyl methylcarbonate having a weight ratio of 2:8 with a concentration of 1 mole/a liter was used as electrolyte. The determination results of the cell for measurement are shown in Table 1. Note that difference between SP value of a coat polymer and that of a solvent used for electrolyte was 0.05.

Example 21

Negative electrode was obtained as is the same with example 2, except 10 parts of lithium metal powder having a coated surface with respect to 100 parts of negative electrode active material in composite particles (A) was dry mixed for 10 minutes at a rotation number of 500 rpm; and then a mixed powder was obtained.

100 parts of active carbon as a positive electrode active material, 5 parts, as a solid content, of 28% moisture dispersion of acrylate polymer (butyl acrylate methyl methacrylate itaconic acid=80:15:5 (mass ratio), Tg=−28° C., 0.3 μm of number average particle diameter) as a water dispersible binding agent, 5 parts of acetylene black (Denka Black powder by Denki Kagaku Kogyo Kabushiki Kaisha) having an average particle diameter of 0.7 μm as conductive agent, 1.4 parts, as a solid content, of 1.5% water solution of carboxymethyl cellulose sodium salt ("BSH-6" by Dai-ichi Kogyo Seiyaku Co., Ltd.) as a dissolve type resin, and 338.7 parts of ion-exchange water were added; and then stirred and mixed thereof by "TK homomixer" by PRIMIX Corp. preparing a slurry of 20% solid content concentration. The slurry showed pH of 6.5 at 23° C. Spray drying granulation was performed with this slurry by using a spray dryer (OC-16 by Ohkawara Kakohki Co., Ltd.) and an atomizer (a diameter of 65 mm) of a rotating disk method with a rotation number of 25,000 rpm, a heated air temperature of 150° C. and a particle collecting outlet temperature of 90° C. And then, composite particles for positive electrode were obtained. A weight average particle diameter of this composite particles was 76 μm.

The above composite particles for positive electrode was supplied to a pressing roll (a roll temperature of 120° C. and a pressing linear pressure of 400 kN/m) of a roll press machine (a press-cutting rough surface heat roll by Hirano Giken Kogyo Co., Ltd.) at a supply rate of 70 g/min. by using a quantitative feeder (Nikka Sprayer K-V by Nikka). Subsequently, a PET film (a thickness of 75 μm and a tension strength of 200 MPa), roughened by kneading a mat material making surface roughness Ra of 0.14 μm, was inserted between pressing rolls as a substrate; the composite particles for positive electrode supplied from quantitative feeder was adhered on the substrate; compression formed thereof at a shape forming rate of 15/min; and then an electrode composition layer for negative electrode having an average thickness of 150 μm and an average single density of 0.58 g/cm$^3$ formed substrate with an electrode composition layer was formed.

Next, a winding storage of substrate with an electrode composition layer was set to unwinder 12 of a device shown in FIG. 1, and detaching only the substrate, subsequently bonded to both surfaces of aluminum current collector wherein the above conductive adhesive is formed by the use of laminating machine 16.

A laminated lithium ion capacitor was manufactured by using the above positive electrode and negative electrode. The determination results of this laminated lithium ion capacitor are shown in Table 1. Note that difference between SP value of a coat polymer and that of a solvent used for electrolyte was 0.68.

Example 22

A laminated sodium secondary battery was manufactured with the same method with example 2, except using sodium as a coated surface alkaline metal, $Na_{0.44}MnO_2$ as a positive electrode active material and a liquid solution, wherein $NaPF_6$ was dissolved to a mixed solvent of ethylenecarbonate and ethyl methylcarbonate having a weight ratio of 3:7 with a concentration of 1 mole/a liter, as an electrolyte. The determination results of this laminated sodium secondary battery are shown in Table 1. Note that difference between SP value of a coat polymer and that of a solvent used for electrolyte was 0.68.

Comparative Example 1

Negative electrode was obtained and cell for measurement was manufactured as is the same with example 1, except using lithium metal powder having an uncoated surface (particle diameter of 30 μm) instead of lithium metal powder having a coated surface. The determination results of this cell for measurement are shown in Table 1.

Comparative Example 2

100 parts of Si—O—C (1200 mAh/g of an initial charging capacity and 360 mAh/g of irreversible capacity) as negative electrode active material, 5 parts of acetylene black (Denka Black powder by Denki Kagaku Kogyo Kabushiki Kaisha) having an average particle diameter of 0.7 µm as conductive agent, 2 parts, as a solid content, of polyvinylidene fluoride "KF Binder #1120" (12 wt % NMP liquid solution by Kureha Corp.) as a binding agent, 10 parts of "Lectro Max Powder 100" (by FMC Lithium) as $CO_2$ surface coated lithium metal particles, and 165 parts of NMP were added to a planetary mixer having disper "T.K. HIVIS DISPER MIX" (by PRIMIX Corp.), subsequently mixed and stirred for 60 minutes.

polymer (or oligomer) coated lithium metal powder, and 120 parts of water were added to a planetary mixer having disper "T.K. HIVIS DISPER MIX" (by PRIMIX Corp.), subsequently mixed and stirred for 60 minutes. Defoaming was treated thereof under reduced pressure, and a slurry for electrode superior in fluidity was obtained.

Slurry for electrode was coated on a copper foil having a thickness of 20 µm with comma coater at a rate of 0.5 m/min. and dried for 2 minutes at 60° C., so that film thickness after drying become 60 µm or so; and then heat treated for 2 minutes at 120° C. preparing an electrode for negative electrode. Note that these works were performed in a dry room under a dew point of −50° C. or less. The same procedures as in example 1 was performed to manufacture positive electrode; and cell for measurement was manufactured. Note that a difference between SP value of polymer (or oligomer) and that of solvent used for electrolyte was 0.11. The determination results of this cell for measurement are shown in Table 1.

TABLE 1

| | Ex. | | | | | | | | | | | | | | | | | | | | | | Comp. Ex. | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 1 | 2 | 3 |
| Peeling Strength | A | A | B | A | A | A | A | B | A | C | C | B | B | B | B | A | B | C | C | C | A | A | B | E | C |
| Predoping Time | A | A | A | A | B | A | A | A | C | C | B | C | B | C | B | B | A | B | B | B | A | A | A | B | B |
| Internal Resistance | A | A | A | B | A | B | B | B | A | B | C | C | B | B | C | B | C | C | B | C | A | B | D | C | E |
| Charge-Discharge Cycle Characteristic | A | A | B | B | A | B | B | B | A | C | C | C | C | B | C | B | B | C | B | B | A | A | E | C | E |

Defoaming was treated thereof under reduced pressure, and a slurry for electrode superior in fluidity was obtained.

Slurry for electrode was coated on a copper foil having a thickness of 20 µm with comma coater at a rate of 0.5 m/min. and dried for 2 minutes at 60° C., so that film thickness after drying become 60 µm or so; and heat treated for 2 minutes at 120° C. preparing an electrode for negative electrode. Note that these works were performed in a dry room under a dew point of −50° C. or less. The same procedures as in example 1 was performed to manufacture positive electrode; and cell for measurement was manufactured. The determination results of this cell for measurement are shown in Table 1.

Comparative Example 3

Nylon 11 was used as a coat polymer; and a substrate wherein nylon 11 was vacuum deposited on a glass substrate was manufactured. Note degree of vacuum immediately prior to deposition was $10^{-3}$ Torr. Subsequently, lithium metal was accumulated on a substrate by a vacuum deposition method, heat treated (100° C., 1 hour) thereof under an argon atmosphere, and a polymer (or oligomer) coated lithium metal powder was obtained. Note degree of vacuum immediately prior to deposition was $10^{-3}$ Torr and deposition amount was 20 nm by a conversion film thickness of crystal oscillator. Further, lithium metal deposition rate was 0.5 nm/min. A mean volume particle diameter of a polymer (or oligomer) coated lithium metal powder was 25 nm. Tg of the coat polymer was 37° C.

100 parts of Si—O—C (1200 mAh/g of an initial charging capacity and 360 mAh/g of irreversible capacity) as negative electrode active material, 12.5 parts of acetylene black (Denka Black powder by Denki Kagaku Kogyo Kabushiki Kaisha) having an average particle diameter of 0.7 µm as conductive agent, 8 parts, as a solid content, of polytetrafluoroethylene "D-210C" (60 wt % moisture dispersion by Daikin Industries, Ltd.) as a binding agent, 10 parts of a From the results of Table 1, the following conclusions can be drawn.

Manufacturing methods (examples 1 to 22) of an electrode for an electrochemical element comprising: (1A) a preparing step of composite particles (A) including an electrode active material and a water dispersible binding agent, (2A) a preparing step of mixed powder by dry mixing composite particles (A) and an alkaline metal powder or an alkaline earth metal powder each having a coated surface, (3A) a foaming step of electrode composition layer by compression forming said mixed powder, and (4A) an integration step of said electrode composition layer and current collector; are superior in a balance of an electrode peeling strength, an electrochemical element productivity, an internal resistance and a charge-discharge cycle characteristic.

On the other hand, according to a manufacturing method (comparative example 1) of an electrode for an electrochemical element which does not use an alkaline metal powder or an alkaline earth metal powder each having a coated surface, the alkaline metal powder or the alkaline earth metal powder deteriorates (oxidizes) during manufacturing steps, and that internal resistance and charge-discharge cycle characteristic of the electrochemical element deteriorates. Further, according to a manufacturing method (comparative examples 2 and 3) of an electrode for an electrochemical element, which wet shape forms an electrode composition layer, a balance among an electrode peeling strength, an internal resistance of electrochemical element and charge-discharge cycle characteristic is inferior, in comparison to the manufacturing method of the present invention. In particular, internal resistance of the obtained electrochemical element increases and charge-discharge cycle characteristic deteriorates, when mean volume particle diameter of a polymer (or oligomer) coated lithium metal powder is small (comparative example 3).

In addition, a high-temperature storage characteristic of the below examples and comparative examples was evaluated as below. Moisture amount measurement method, peeling strength, predoping time, internal resistance and initial discharge capacity are the same as mentioned above.

(A High-Temperature Storage Characteristic)

The obtained electrochemical element (cell for measurement) was charged to 4.2 V with a constant current, and then charged for 10 hours with a constant voltage by a constant-current constant-voltage charging method which is 0.5 C at 25° C. Subsequently, it was stored in a high-temperature bath of 60° C., and taken out after a week. As is the same with initial discharge capacity measurement, discharge capacity after a high-temperature storage was measured, and said discharge capacity after high-temperature storage test with respect to initial discharge capacity was determined a capacity retention rate. Evaluation was made based on the following criteria. The larger the value is, the fewer the deterioration at a high temperature is.

A: 90% or more
B: 80% or more to less than 90%
C: 70% or more to less than 80%
D: 60% or more to less than 70%
E: Less than 60%

Example 23

<Manufacturing Alkaline Metal Powder Having a Coated Surface>

55.72 g of lithium dispersion in oil (lithium content ratio=11.275%) including 6.28 g of lithium was poured in a hastelloy can. The lithium dispersion in oil was heated to 75° C., 1.9 g of 10% p-xylene (Aldrich) liquid solution of polymethylmethacrylate "81504, Fluka" (Sigma-Aldrich) was added as coat polymer, stirred for 22 hours at 200 rpm, and then a lithium dispersed material was obtained. Then, the lithium dispersed material was cooled to a room temperature. In addition, lithium dispersed material was filtrated in order to remove hydrocarbon oil solvent; and then the obtained filtrate was washed with hexane for 3 times and with n-pentane for 2 times. The obtained washed filtrate was dried in a dried argon. Thus, lithium metal powder having a coated surface with a mean volume particle diameter of 30 µm is obtained. Note a coated film thickness was 20 nm, and an additive amount of coat polymer with respect to 100 parts of lithium metal powder was 3 parts. Further, Tg of coat polymer was 105° C. In addition, a difference between SP value of coat polymer and that of non-aqueous solvent (n-hexane) used for manufacturing composite particles (B) was 1.74.

<Manufacturing Composite Particles (B)>

100 parts of Si—O—C (1200 mAh/g of an initial charging capacity and 360 mAh/g of irreversible capacity) as negative electrode active material, 2 parts, as a solid content, of 10% n-hexane solution of styrene.butadiene copolymer (styrene:butadiene=60:40 (mass ratio), glass-transition temperature: Tg=−1° C.) as a water dispersible binding agent, 10 parts of the above lithium metal powder having a coated surface, 5 parts of acetylene black (Denka Black powder by Denki Kagaku Kogyo Kabushiki Kaisha) having an average particle diameter of 0.7 µm as conductive agent, and 410 parts of n-hexane as non-aqueous solvent were added; and then stirred and mixed thereof by "TK homomixer" by PRIMIX Corp. preparing a slurry of 20% solid content concentration. Spray drying granulation was performed by using a spray dryer (OC-16 by Ohkawara Kakohki Co., Ltd.) and an atomizer (a diameter of 65 mm) of a rotating disk method with a rotation number of 25,000 rpm, a heated air temperature of 150° C. and a particle collecting outlet temperature of 90° C. And then, composite particles (B) were obtained. A weight average particle diameter of composite particles (B) was 54 µm.

Further, composite particles (B) were vacuum-dried for 24 hours at 150° C., and moisture amount of said composite particles (B) was confirmed to be 50 ppm or less.

<Manufacturing a slurry for forming conductive adhesive layer>, <formation of conductive adhesive layer> and <formation of an electrode composition layer for negative electrode> were performed as is the same with example 1, except the above composite particles (B) were used instead of the mixed powder used in example 1; and a negative electrode was manufactured.

<Manufacturing a Positive Electrode>

100 parts of LiMn$_2$O$_4$ having a spinel structure as a positive electrode active material, 2 parts of 8% toluene liquid solution of acrylate polymer (butyl acrylate:methyl methacrylate itaconic acid=80:15:5 (mass ratio), Tg=−28° C., 0.3 µm of number average particle diameter) as a water dispersible binding agent, 5 parts of acetylene black (Denka Black powder by Denki Kagaku Kogyo Kabushiki Kaisha) having an average particle diameter of 0.7 µm as conductive agent, and 137.5 parts of toluene as non-aqueous solvent were added; and then stirred and mixed thereof by "TK homomixer" by PRIMIX Corp. preparing a slurry of 40% solid content concentration. Spray drying granulation was performed to this slurry by using a spray dryer (OC-16 by Ohkawara Kakohki Co., Ltd.) and an atomizer (a diameter of 65 mm) of a rotating disk method with a rotation number of 25,000 rpm, a heated air temperature of 150° C. and a particle collecting outlet temperature of 90° C. And then, composite particles for positive electrode were obtained. A weight average particle diameter of the composite particles was 43 µm.

Positive electrode was manufactured as is the same with example 1, except the above slurry was used.

<Manufacturing Cell for Measurement>

Cell for measurement was manufactured as is the same with example 1, except using the above manufactured double-sided electrode (positive electrode, negative electrode). A difference between SP value of coat polymer and that of solvent used for electrolyte was 1.66.

The determination results of this cell for measurement are shown in Table 2.

Example 24

Composite particles (B) was obtained as is the same with example 23, except a hard carbon ("Carbotron P" by Kureha Corp., having an average particle diameter of 10 µm) was used instead of Si—O—C as negative electrode active material, and additive amount of lithium metal powder having a coated surface was 2 parts; and subsequently negative electrode and cell for measurement were manufactured. The determination results of this cell for measurement are shown in Table 2. A weight average particle diameter of composite particles (B) was 45 µm, and a moisture amount of said composite particles (B) was 50 ppm or less. A difference between SP value of coat polymer and that of non-aqueous solvent (n-hexane) used for manufacturing composite particles (B) was 1.74. And a difference between SP value of coat polymer and that of solvent used for electrolyte was 1.66.

Example 25

Composite particles (B) was obtained as is the same with example 23, except 10% tetrahydrofuran liquid solution of acrylate polymer (butyl acrylate:methyl methacrylate itaconic acid=80:15:5 (mass ratio), Tg=−28° C., 0.3 µm of number average particle diameter) was used instead of 10% n-hexane solution of styrene.butadiene copolymer (styrene:

butadiene=60:40 (mass ratio), glass-transition temperature: Tg=−1° C.) as a binding agent for negative electrode, and tetrahydrofuran was used instead of n-hexane as non-aqueous solvent; and subsequently negative electrode and cell for measurement were manufactured. The determination results of this cell for measurement are shown in Table 2. A weight average particle diameter of composite particles (B) was 53 μm, and a moisture amount of said composite particles (B) was 50 ppm or less. Difference between SP value of coat polymer and that of non-aqueous solvent (tetrahydrofuran) used for manufacturing composite particles (B) was 0.46. And a difference between SP value of coat polymer and that of solvent used for electrolyte was 1.66.

Example 26

Lithium metal powder having a coated surface was obtained as is the same with example 23, except a stirred condition when preparing lithium dispersed material was 250 rpm and additive amount of 10% p-xylene liquid solution of polymethylmethacrylate used as a coat polymer was 3.8 g. Note that, a mean volume particle diameter of lithium metal powder having a coated surface was 15 μm, a coated film thickness thereof was 20 nm, and an additive amount of coat polymer with respect to 100 parts of lithium metal powder was 3 parts.

Composite particles (B) were obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 40 μm, and moisture amount of the same was 50 ppm or less. Note that difference between SP value of coat polymer and that of non-aqueous solvent (n-hexane) used for manufacturing composite particles (B) was 1.74. And a difference between SP value of coat polymer and that of solvent used for electrolyte was 1.66.

Example 27

Lithium metal powder having a coated surface was obtained as is the same with example 23, except a stirred condition when preparing lithium dispersed material was 100 rpm and additive amount of 10% p-xylene liquid solution of polymethylmethacrylate used as a coat polymer was 0.80 g. Note that, a mean volume particle diameter of lithium metal powder having a coated surface was 70 μm, a coated film thickness thereof was 20 nm, and an additive amount of coat polymer with respect to 100 parts of lithium metal powder was 9 parts.

A composite particle (B) was obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 110 μm, and moisture amount of the same was 50 ppm or less. Note that difference between SP value of coat polymer and that of non-aqueous solvent (n-hexane) used for manufacturing composite particles (B) was 1.74. And a difference between SP value of coat polymer and that of solvent used for electrolyte was 1.66.

Example 28

Lithium metal powder having a coated surface was obtained as is the same with example 23, except additive amount of 10% p-xylene liquid solution of polymethylmethacrylate used as a coat polymer was 0.47 g. Note that, a mean volume particle diameter of lithium metal powder having a coated surface was 30 μm, a coated film thickness thereof was 5 nm, and an additive amount of coat polymer with respect to 100 parts of lithium metal powder was 0.5 parts.

A composite particle (B) was obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 55 μm, and moisture amount of the same was 50 ppm or less. Note that difference between SP value of coat polymer and that of non-aqueous solvent (n-hexane) used for manufacturing composite particles (B) was 1.74. And a difference between SP value of coat polymer and that of solvent used for electrolyte was 1.66.

Example 29

Lithium metal powder having a coated surface was obtained as is the same with example 23, except 1.9 g of 10% p-xylene (Aldrich) liquid solution of polystyrene ("Polybead Polystyrene Microspheres"<1.00 μm, Dry Form" by Techno Chemical Corp.) was used as coat polymer, instead of polymethylmethacrylate. Note that, a mean volume particle diameter of lithium metal powder having a coated surface was 30 μm, a coated film thickness thereof was 20 nm, and an additive amount of coat polymer with respect to 100 parts of lithium metal powder was 3 parts. In addition, Tg of coat polymer was 100° C.

A composite particle (B) was obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 54 μm, and moisture amount of the same was 50 ppm or less. Note that difference between SP value of coat polymer and that of non-aqueous solvent (n-hexane) used for manufacturing composite particles (B) was 2.18. And a difference between SP value of coat polymer and that of solvent used for electrolyte was 1.22.

Example 30

Lithium metal powder having a coated surface was obtained as is the same with example 23, except 1.9 g of 10% p-xylene (Aldrich) liquid solution of polyacrylonitrile (by Sigma-Aldrich) was used as coat polymer, instead of polymethylmethacrylate. Note that, a mean volume particle diameter of lithium metal powder having a coated surface was 30 μm, a coated film thickness thereof was 50 nm, and an additive amount of coat polymer with respect to 100 parts of lithium metal powder was 7.5 parts. In addition, Tg of coat polymer was 97° C.

A composite particle (B) was obtained, and subsequently negative electrode was manufactured as is the same with example 23, except using said lithium metal powder having a coated surface. And cell for measurement was manufactured as is the same with example 23, except using said negative electrode and a liquid solution of $LiPF_6$ dissolved propylene carbonate having a concentration of 1 mole/liter was used as electrolyte. The determination results of the cell for measurement are shown in Table 2. Weight average particle diameter of composite particles (B) was 56 μm, and moisture amount of the same was 50 ppm or less. Note that difference between SP value of coat polymer and that of non-aqueous solvent (n-hexane) used for manufacturing composite particles (B) was 5.08. And a difference between SP value of coat polymer and that of solvent used for electrolyte was 0.82.

Example 31

Lithium metal powder having a coated surface was obtained as is the same with example 23, except 1.9 g of 10% p-xylene (Aldrich) liquid solution of styrene.methyl methacrylate copolymer ("E-103" by Nippon Paint Co., Ltd.) was used as coat polymer, instead of polymethylmethacrylate. Note that, a mean volume particle diameter of lithium metal powder having a coated surface was 30 μm, a coated film thickness thereof was 20 nm, and an additive amount of coat polymer with respect to 100 parts of lithium metal powder was 3 parts. In addition, Tg of coat polymer was 120° C.

A composite particle (B) was obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 53 μm, and moisture amount of the same was 50 ppm or less. Note that difference between SP value of coat polymer and that of non-aqueous solvent (n-hexane) used for manufacturing composite particles (B) was 2.85. And a difference between SP value of coat polymer and that of solvent used for electrolyte was 0.55.

Example 32

Lithium metal powder having a coated surface was obtained as is the same with example 23, except 1.9 g of 10% p-xylene (Aldrich) liquid solution of styrene:butadiene=85:15 (mass ratio) was used as coat polymer, instead of polymethylmethacrylate. Note that, a mean volume particle diameter of lithium metal powder having a coated surface was 30 μm, a coated film thickness thereof was 30 nm, and an additive amount of coat polymer with respect to 100 parts of lithium metal powder was 3 parts. In addition, Tg of coat polymer was 54° C.

A composite particle (B) was obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 56 μm, and moisture amount of the same was 50 ppm or less. Note that difference between SP value of coat polymer and that of non-aqueous solvent (n-hexane) used for manufacturing composite particles (B) was 2.01. And a difference between SP value of coat polymer and that of solvent used for electrolyte was 3.89.

Example 33

Lithium metal powder having a coated surface was obtained as is the same with example 23, except $CO_2$ was used instead of polymethylmethacrylate. Note that, a mean volume particle diameter of lithium metal powder having a coated surface was 30 μm, a coated film thickness thereof was 100 nm, and an additive amount of $CO_2$ with respect to 100 parts of lithium metal powder was 15 parts.

A composite particle (B) was obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 54 μm, and moisture amount of the same was 50 ppm or less.

Example 34

Lithium metal powder having a coated surface was obtained as is the same with example 23, except wax (Luwax A by BASF) was used instead of polymethylmethacrylate. Note that, a mean volume particle diameter of lithium metal powder having a coated surface was 30 μm, a coated film thickness thereof was 5 nm, and an additive amount of wax with respect to 100 parts of lithium metal powder was 1 part.

A composite particle (B) was obtained, and subsequently negative electrode and cell for measurement were manufactured as is the same with example 23, except using said lithium metal powder having a coated surface. The determination results of the cell for measurement are shown in Table 2. Weight average particle diameter of composite particles (B) was 57 μm, and moisture amount of the same was 50 ppm or less.

Example 35

A cell for measurement was manufactured as is the same with example 1, except using copper current collector, wherein conductive adhesive layer is coated on both surfaces, instead of a substrate used when forming composition layer for negative electrode; and directly forming an electrode composition layer on both surfaces of conductive adhesive layer of copper current collector, preparing negative electrode. The determination results of the cell for measurement are shown in Table 2.

Example 36

A composite particle (B) was obtained, and subsequently negative electrode and cell for measurement were manufactured as is the same with example 23, except using cyclopentylmethyl ether (CPME) as non-aqueous solvent when manufacturing composite particles (B). The determination results of the cell for measurement are shown in Table 2. Weight average particle diameter of composite particles (B) was 55 μm, and moisture amount of the same was 50 ppm or less. Difference between SP value of coat polymer and that of non-aqueous solvent (CPME) used when manufacturing composite particles (B) was 0.64.

Example 37

A composite particle (B) was obtained, and subsequently negative electrode was manufactured as is the same with example 24, except additive amount of lithium metal powder having a coated surface was 9 parts with respect to 100 parts of negative electrode active material in composite particles (B).

100 parts of active carbon as a positive electrode active material, 5 parts, as a solid content, of 28% moisture dispersion of acrylate polymer (butyl acrylate:methyl methacrylate: itaconic acid=80:15:5 (mass ratio), Tg=−28° C., 0.3 μm of number average particle diameter) as a water dispersible binding agent, 5 parts of acetylene black (Denka Black powder by Denki Kagaku Kogyo Kabushiki Kaisha) having an average particle diameter of 0.7 μm as conductive agent, 1.4 parts, as a solid content, of 1.5% water solution of carboxymethyl cellulose sodium salt ("BSH-6" by Dai-ichi Kogyo Seiyaku Co., Ltd.) as a dissolve type resin, and 338.7 parts of ion-exchange water were added; and then stirred and mixed thereof by "TK homomixer" by PRIMIX Corp. preparing a slurry of 20% solid content concentration. The slurry showed pH of 6.5 at 23° C. Spray drying granulation was performed to this slurry by using a spray dryer (OC-16 by Ohkawara Kakohki Co., Ltd.) and an atomizer (a diameter of 65 mm) of a rotating disk method with a rotation number of 25,000 rpm, a heated air temperature of 150° C. and a particle collecting outlet temperature of 90° C. And then, composite particles for positive electrode were obtained. A weight average particle diameter of this composite particles was 76 μm.

The above composite particles for positive electrode was supplied to a pressing roll (a roll temperature of 120° C. and a pressing linear pressure of 400 kN/m) of a roll press machine (a press-cutting rough surface heat roll by Hirano Giken Kogyo Co., Ltd.) at a supply rate of 70 g/min by using a quantitative feeder (Nikka Sprayer K-V by Nikka). Subsequently, a PET film (a thickness of 75 μm and a tension strength of 200 MPa), roughened by kneading a mat material making surface roughness Ra of 0.14 μm, was inserted between pressing rolls as a substrate; the composite particles for positive electrode supplied from quantitative feeder was adhered on the substrate; compression formed thereof at a shape forming rate of 15/min; and then an electrode composition layer for negative electrode having an average thickness of 150 μm and an average single density of 0.5 g/cm$^3$ formed substrate with an electrode composition layer was formed.

Next, a winding storage of substrate with an electrode composition layer was set to unwinder 12 of a device shown in FIG. 1, and detaching only the substrate, subsequently bonded to both surfaces of aluminum current collector wherein the above conductive adhesive is formed by the use of laminating machine 16.

A laminated lithium ion capacitor was manufactured by using the above positive electrode and negative electrode. The determination results of this laminated lithium ion capacitor are shown in Table 2. Weight average particle diameter of composite particles (B) was 53 μm, and moisture amount of the same was 50 ppm or less. Note that difference between SP value of a coat polymer and that of non-aqueous solvent (n-hexane) used for manufacturing composite particles (B) was 1.74; and difference between SP value of a coat polymer and that of solvent used for electrolyte was 1.66.

Example 38

A laminated sodium secondary battery was manufactured with the same method with example 24, except using sodium as a coated surface alkaline metal, $Na_{0.44}MnO_2$ as a positive electrode active material and a liquid solution, wherein $NaPF_6$ was dissolved to a mixed solvent of ethylenecarbonate and ethyl methylcarbonate having a weight ratio of 3:7 with a concentration of 1 mole/a liter, as an electrolyte. The determination results of this laminated sodium secondary battery are shown in Table 2. Note that difference between SP value of a coat polymer and that of non-aqueous solvent (n-hexane) used for manufacturing composite particles (B) was 1.74; and difference between SP value of a coat polymer and that of solvent used for electrolyte was 1.66.

Comparative Example 4

100 parts of Si—O—C (1200 mAh/g of an initial charging capacity and 360 mAh/g of irreversible capacity) as negative electrode active material, 2 parts, as a solid content, of 10% toluene liquid solution of styrene.butadiene copolymer (styrene:butadiene=85:15 (mass ratio)) as binding agent, 10 parts of lithium metal powder having a coated surface, 5 parts of acetylene black (Denka Black powder by Denki Kagaku Kogyo Kabushiki Kaisha) having an average particle diameter of 0.7 μm as conductive agent and 142 parts of toluene as non-aqueous solvent were added; and then stirred and mixed thereof by "TK homomixer" by PRIMIX Corp. preparing a slurry of 40% solid content concentration.

A cell for measurement was manufactured with the same method with example 23, except the above slurry was coated on a conductive adhesive layer formed copper current collector, preparing a current collector with an electrode composition layer (negative electrode), wherein an electrode composition layer for negative electrode having a thickness of 60 μm and an average single density of 1.2 g/cm$^3$ is formed on both surfaces of copper current collector. The determination results of this cell for measurement are shown in Table 2. Note that difference between SP value of a coat polymer and that of solvent used for electrolyte was 1.66.

Comparative Example 5

Composite particles (B) and negative electrode were prepared, and then cell for measurement was manufactured as is the same with example 23, except using lithium metal powder having uncoated surface (particle diameter of 30 μm), instead of lithium metal powder having a coated surface. The determination results of this cell for measurement are shown in Table 2.

Comparative Example 6

Slurry was prepared, and subsequently negative electrode and cell for measurement were manufactured as is the same with comparative example 4, except a hard carbon ("Carbotron P" by Kureha Corp. having an average particle diameter of 10 μm) instead of Si—O—C as negative electrode active material was used, and an additive amount of lithium metal powder having a coated surface was 2 parts. The determination results of the cell for measurement are shown in Table 2. Note that difference between SP value of a coat polymer and that of solvent used for electrolyte was 1.66.

TABLE 2

| | Ex. | | | | | | | | | | | | | | | | Comp. Ex. | | |
|---|---|---|---|---|---|---|---|---|---|---|---|---|---|---|---|---|---|---|---|
| | 23 | 24 | 25 | 26 | 27 | 28 | 29 | 30 | 31 | 32 | 33 | 34 | 35 | 36 | 37 | 38 | 4 | 5 | 6 |
| Peeling Strength | A | A | B | A | B | B | B | B | B | A | C | C | C | A | A | A | B | D | C |
| Predoping Time | A | A | A | A | B | A | A | B | A | C | A | B | A | A | B | A | A | B | A |
| Internal Resistance | A | A | A | B | A | B | B | A | B | A | B | B | B | B | A | B | B | D | E | E |
| High-Temperature Storage Characteristic | A | A | B | B | A | B | B | B | A | A | B | C | B | B | A | B | E | E | D |

From the results of Table 2, the following conclusions can be drawn.

Manufacturing methods (examples 23 to 38) of an electrode for an electrochemical element comprising: (1B) a preparing step of composite particles (B) including an electrode active material, a binding agent and an alkaline metal powder or an alkaline earth metal powder each having a coated surface; (2B) a foaming step of an electrode composition layer by compression forming the composite particles (B); and (3B) an integration step of the electrode composition layer and current collector; are superior in a balance of an electrode peeling strength, an electrochemical element productivity, an internal resistance and a high-temperature storage characteristic.

On the other hand, according to a manufacturing method (comparative examples 4 and 6) of an electrode for an electrochemical element, which wet shape forms an electrode composition layer, a balance among an electrode peeling strength, an internal resistance of electrochemical element and high-temperature storage characteristic is inferior, in comparison to the manufacturing method of the present invention. In addition, according to a manufacturing method (comparative example 5) of an electrode for an electrochemical element which does not use an alkaline metal powder or an alkaline earth metal powder each having a coated surface, the alkaline metal powder or the alkaline earth metal powder deteriorates (oxidizes) during manufacturing steps, and that electrode peeling strength and internal resistance and charge-discharge cycle characteristic of the electrochemical element deteriorate.

The invention claimed is:

1. A manufacturing method of an electrode for an electrochemical element by compression forming a mixed powder including an alkaline metal powder or an alkaline earth metal powder, each having a coated surface,
wherein the method comprises: (1A) a preparing step of composite particles (A) including an electrode active material and a water dispersible binding agent; (2A) a preparing step of a mixed powder by dry mixing the composite particles (A) and the alkaline metal powder or the alkaline earth metal powder, each having a coated surface; (3A) a foaming step of an electrode composition layer by compression forming the mixed powder; and (4A) an integration step of the electrode composition layer and a current collector.

2. The manufacturing method of the electrode for the electrochemical element according to claim 1, wherein (3A) is the foaming step of the electrode composition layer on a substrate by compression forming the mixed powder.

3. The manufacturing method of the electrode for the electrochemical element according to claim 2, comprising a detachment step of the substrate from an electrode composition layer surface, performed after the (4A) step.

4. The manufacturing method of the electrode for the electrochemical element according to claim 2, wherein the substrate is subjected to a roughening treatment.

5. The manufacturing method of an electrode for an electrochemical element according to claim 1, wherein a mean volume particle diameter of the alkaline metal powder or the alkaline earth metal powder each having a coated surface is 1 to 100 μm.

6. A manufacturing method of an electrode for an electrochemical element by compression forming composite particles (B) including an alkaline metal powder or an alkaline earth metal powder, each having a coated surface,
wherein the method comprises: (1B) a preparing step of the composite particles (B) including an electrode active material, a binding agent, and an alkaline metal powder or an alkaline earth metal powder, each having a coated surface; (2B) a foaming step of an electrode composition layer by compression forming the composite particles (B); and (3B) an integration step of the electrode composition layer and a current collector.

7. The manufacturing method of the electrode for the electrochemical element according to claim 6, wherein (2B) is the foaming step of electrode composition layer on a substrate by compression forming the composite particles (B).

8. The manufacturing method of the electrode for the electrochemical element according to claim 7, comprising a detachment step of the substrate from an electrode composition layer surface, performed after the (3B) step.

9. The manufacturing method of the electrode for the electrochemical element according to claim 6, wherein a conductive adhesive layer is formed on at least one surface of the current collector.

10. The manufacturing method of an electrode for an electrochemical element according to claim 6, wherein the step (1B) comprises:
(1B-1) a slurry preparation step wherein the electrode active material, the binding agent and the alkaline metal powder or the alkaline earth metal powder each having a coated surface are mixed in a non-aqueous solvent; and
(1B-2) a composite particles preparation step by granulating the slurry.

11. The manufacturing method of the electrode for the electrochemical element according to claim 10, wherein the granulation is a spray drying granulation.

12. The manufacturing method of the electrode for the electrochemical element according to claim 1, wherein the alkaline metal powder or the alkaline earth metal powder each having a coated surface is an alkaline metal powder or an alkaline earth metal powder each having a polymer coated surface, and
a difference between solubility parameter (SP value) of the polymer and that of a solvent used for an electrolyte of the electrochemical element is within a range of 0.3 to 5.0 $(cal/cm^3)^{1/2}$.

13. An electrochemical element equipped with the electrode for an electrochemical element obtained from the method according to claim 1.

14. The manufacturing method of the electrode for the electrochemical element according to claim 3, wherein the substrate is subjected to a roughening treatment.

15. The manufacturing method of an electrode for an electrochemical element according to claim 2, wherein a mean volume particle diameter of the alkaline metal powder or the alkaline earth metal powder each having a coated surface is 1 to 100 μm.

16. The manufacturing method of an electrode for an electrochemical element according to claim 3, wherein a mean volume particle diameter of the alkaline metal powder or the alkaline earth metal powder each having a coated surface is 1 to 100 μm.

17. The manufacturing method of an electrode for an electrochemical element according to claim 4, wherein a mean volume particle diameter of the alkaline metal powder or the alkaline earth metal powder each having a coated surface is 1 to 100 μm.

18. The manufacturing method of the electrode for the electrochemical element according to claim 7, wherein a conductive adhesive layer is formed on at least one surface of the current collector.

19. The manufacturing method of the electrode for the electrochemical element according to claim 8, wherein a conductive adhesive layer is formed on at least one surface of the current collector.

20. The manufacturing method of an electrode for an electrochemical element according to claim 7, wherein the step (1B) comprises:
 (1B-1) a slurry preparation step wherein the electrode active material, the binding agent and the alkaline metal powder or the alkaline earth metal powder each having a coated surface are mixed in a non-aqueous solvent; and
 (1B-2) a composite particles preparation step by granulating the slurry.

* * * * *